US011771000B2

United States Patent
Patton et al.

(10) Patent No.: US 11,771,000 B2
(45) Date of Patent: Oct. 3, 2023

(54) WALK REEL MOWER WITH COMMON MOUNT

(71) Applicant: The Toro Company, Bloomington, MN (US)

(72) Inventors: Robert D. Patton, New Prague, MN (US); Gerald E. Goman, Spring Valley, WI (US)

(73) Assignee: The Toro Company, Bloomington, MN (US)

( * ) Notice: Subject to any disclaimer, the term of this patent is extended or adjusted under 35 U.S.C. 154(b) by 144 days.

(21) Appl. No.: 17/362,259

(22) Filed: Jun. 29, 2021

(65) Prior Publication Data
US 2021/0321563 A1    Oct. 21, 2021

Related U.S. Application Data

(62) Division of application No. 16/234,118, filed on Dec. 27, 2018, now Pat. No. 11,051,450.
(Continued)

(51) Int. Cl.
*A01D 34/62* (2006.01)
*A01D 34/47* (2006.01)
(Continued)

(52) U.S. Cl.
CPC .............. *A01D 34/62* (2013.01); *A01D 34/47* (2013.01); *A01B 45/00* (2013.01); *A01D 34/43* (2013.01);
(Continued)

(58) Field of Classification Search
CPC ........ A01B 45/00; A01D 34/62; A01D 34/47; A01D 34/43; A01D 34/44; A01D 34/53;
(Continued)

(56) References Cited

U.S. PATENT DOCUMENTS 2,145,440 A * 1/1939 George ................ A01D 75/306
56/7
2,283,161 A 5/1942 Booton
(Continued)

FOREIGN PATENT DOCUMENTS

CA    2847027 A1 * 3/2013    ........... A01D 34/435
CN    1529548 A * 9/2004    ............ A01D 34/58
(Continued)

OTHER PUBLICATIONS

Great Britain Examination Report for Application No. GB2107858.9 dated May 19, 2022.
(Continued)

*Primary Examiner* — Arpad F Kovacs
(74) *Attorney, Agent, or Firm* — Merchant & Gould P.C.

(57) ABSTRACT

A walk reel mower has a traction frame that carries at least one ground engaging member operatively powered by a prime mover The mower includes a handle assembly that extends rearwardly and upwardly from the traction frame. The handle assembly includes a handle to be gripped by a user when operating the mower. The handle guides and manipulates the mower. The mower also includes a common mount adapted to attach a reel cutting unit to the traction frame. The common mount has a first pair of laterally spaced mounting surfaces on the traction frame and a second pair of laterally spaced mounting surfaces on the reel cutting unit. The first pair of mounting surfaces face forwardly with respect to a forward direction of movement, and the second pair of mounting surfaces face rearwardly with respect to the forward direction of movement.

7 Claims, 13 Drawing Sheets

Related U.S. Application Data

(60) Provisional application No. 62/758,304, filed on Nov. 9, 2018.

(51) Int. Cl.

| | | |
|---|---|---|
| A01D 34/53 | (2006.01) | |
| A01D 101/00 | (2006.01) | |
| A01D 34/43 | (2006.01) | |
| A01D 34/44 | (2006.01) | |
| A01D 75/30 | (2006.01) | |
| A01D 42/08 | (2006.01) | |
| A01B 45/00 | (2006.01) | |

(52) U.S. Cl.
CPC .............. *A01D 34/44* (2013.01); *A01D 34/53* (2013.01); *A01D 42/08* (2013.01); *A01D 75/306* (2013.01); *A01D 2101/00* (2013.01)

(58) Field of Classification Search
CPC ... A01D 42/08; A01D 75/306; A01D 2101/00
See application file for complete search history.

(56) References Cited

U.S. PATENT DOCUMENTS

| | | | |
|---|---|---|---|
| 2,477,442 A | | 7/1949 | Cramer, Jr. et al. |
| 2,602,953 A | | 7/1952 | Dalglish et al. |
| 3,603,162 A | * | 9/1971 | Gohler .................. A01B 51/02 |
| | | | 74/606 R |
| 3,783,592 A | | 1/1974 | Schraut |
| 4,689,939 A | | 9/1987 | Seyerle |
| 4,930,369 A | | 6/1990 | Barnard et al. |
| 5,155,985 A | | 10/1992 | Oshima et al. |
| 5,197,753 A | | 3/1993 | Liu |
| 5,251,711 A | | 10/1993 | Meyer et al. |
| 5,375,674 A | | 12/1994 | Peter |
| 5,509,258 A | | 4/1996 | Thier et al. |
| 5,625,923 A | | 5/1997 | Huang |
| 5,850,758 A | | 12/1998 | McCloud et al. |
| 5,984,031 A | | 11/1999 | Velke et al. |
| 6,082,083 A | | 7/2000 | Stalpes et al. |
| 6,347,777 B1 | | 2/2002 | Webber et al. |
| 6,351,929 B1 | * | 3/2002 | Gust ..................... A01D 75/30 |
| | | | 56/15.5 |
| 6,467,245 B1 | * | 10/2002 | Humphrey ............. A01D 34/62 |
| | | | 404/133.05 |
| 6,487,837 B1 | | 12/2002 | Fillman et al. |
| 6,523,334 B1 | | 2/2003 | Dettmann |
| 6,643,959 B2 | * | 11/2003 | Jolliff ..................... F02B 63/02 |
| | | | 37/244 |
| 6,644,002 B2 | | 11/2003 | Trefz |
| 6,647,703 B2 | * | 11/2003 | Oliver .................... A01D 34/62 |
| | | | 56/2 |
| 6,769,501 B2 | | 8/2004 | Iida et al. |
| 6,848,523 B2 | | 2/2005 | Ishikawa et al. |
| 6,945,133 B2 | | 9/2005 | Rush et al. |
| 7,063,177 B1 | | 6/2006 | Crumly |
| 7,178,322 B2 | | 2/2007 | Osborne |
| 7,191,584 B2 | | 3/2007 | Goman et al. |
| 7,918,077 B2 | * | 4/2011 | Coleman ................ A01B 45/00 |
| | | | 56/249 |
| 7,984,573 B2 | * | 7/2011 | Lau ........................ A01B 45/00 |
| | | | 37/242 |
| 8,104,252 B1 | * | 1/2012 | Godley, Jr. ............. A01D 42/04 |
| | | | 56/2 |
| 8,161,720 B1 | * | 4/2012 | Humphrey ............. A01D 42/00 |
| | | | 172/21 |
| 8,316,628 B2 | * | 11/2012 | Humphrey ........... A01B 45/026 |
| | | | 56/249.5 |
| 8,376,646 B2 | | 2/2013 | Melino, Sr. et al. |
| 8,485,488 B2 | | 7/2013 | Forrest et al. |
| 8,839,692 B2 | | 9/2014 | Yanai et al. |
| 8,978,796 B2 | * | 3/2015 | Gallazzini .............. B62D 11/04 |
| | | | 180/53.6 |
| 9,038,356 B2 | | 5/2015 | Shao et al. |
| 9,220,193 B2 | * | 12/2015 | Goman ................. A01D 75/306 |
| 9,986,683 B2 | | 6/2018 | Zhang et al. |
| 10,087,590 B2 | | 10/2018 | Lins et al. |
| 10,130,031 B2 | | 11/2018 | Yoshimura et al. |
| 10,433,478 B2 | | 10/2019 | Smith et al. |
| 11,051,450 B2 | | 7/2021 | Goman et al. |
| 11,272,658 B2 | | 3/2022 | Jiang |
| 11,337,369 B2 | | 5/2022 | Kurihara et al. |
| 2002/0034994 A1 | | 3/2002 | Johnson et al. |
| 2002/0189137 A1 | | 12/2002 | Cox et al. |
| 2004/0031629 A1 | | 2/2004 | Walker |
| 2004/0154275 A1 | | 8/2004 | Derby et al. |
| 2004/0194982 A1 | | 10/2004 | Fukuzumi et al. |
| 2005/0257512 A1 | | 11/2005 | Derby et al. |
| 2006/0053763 A1 | | 3/2006 | Stover et al. |
| 2006/0062632 A1 | | 3/2006 | Jang |
| 2007/0256401 A1 | | 11/2007 | Hibi et al. |
| 2008/0105445 A1 | | 5/2008 | Dayton et al. |
| 2009/0025355 A1 | | 1/2009 | Hibi et al. |
| 2009/0094956 A1 | | 4/2009 | Barlow et al. |
| 2010/0199623 A1 | | 8/2010 | Akahane |
| 2010/0313429 A1 | | 12/2010 | Yamaoka et al. |
| 2013/0199147 A1 | | 8/2013 | Akahane |
| 2013/0205735 A1 | | 8/2013 | Schmidt et al. |
| 2013/0205739 A1 | | 8/2013 | Patton et al. |
| 2014/0030012 A1 | | 1/2014 | Lee |
| 2014/0130837 A1 | | 5/2014 | Sy-Facunda |
| 2014/0167398 A1 | | 6/2014 | Bums et al. |
| 2015/0108728 A1 | | 4/2015 | Nie et al. |
| 2016/0113197 A1 | * | 4/2016 | Mahalingham ........ A01D 34/44 |
| | | | 56/255 |
| 2017/0367258 A1 | | 12/2017 | Shaffer et al. |
| 2018/0279548 A1 | | 10/2018 | Goman et al. |
| 2018/0352736 A1 | | 12/2018 | Kulkarni et al. |
| 2019/0230852 A1 | | 8/2019 | Curtis et al. |
| 2020/0000026 A1 | | 1/2020 | Shoaf et al. |
| 2021/0321562 A1 | | 10/2021 | Langworthy et al. |
| 2021/0321563 A1 | | 10/2021 | Patton et al. |

FOREIGN PATENT DOCUMENTS

| | | |
|---|---|---|
| CN | 202019551 U | 11/2011 |
| CN | 104303690 A | 1/2015 |
| DE | 20 2004 019 453 U1 | 5/2006 |
| GB | 1 003 733 A | 9/1965 |
| GB | 1 326 735 A | 8/1973 |
| GB | 2 386 813 A | 1/2003 |
| JP | 2-219513 A | 9/1990 |
| JP | 8-51842 A | 2/1996 |
| JP | 2002-165509 A | 6/2002 |
| WO | 2017/066396 A1 | 4/2017 |

OTHER PUBLICATIONS

International Search Report and Written Opinion for International Application No. PCT/US2019/059796 dated Apr. 7, 2020.
Great Britain Combined Search and Examination Report for GB2300527.5 dated Feb. 9, 2023.

* cited by examiner

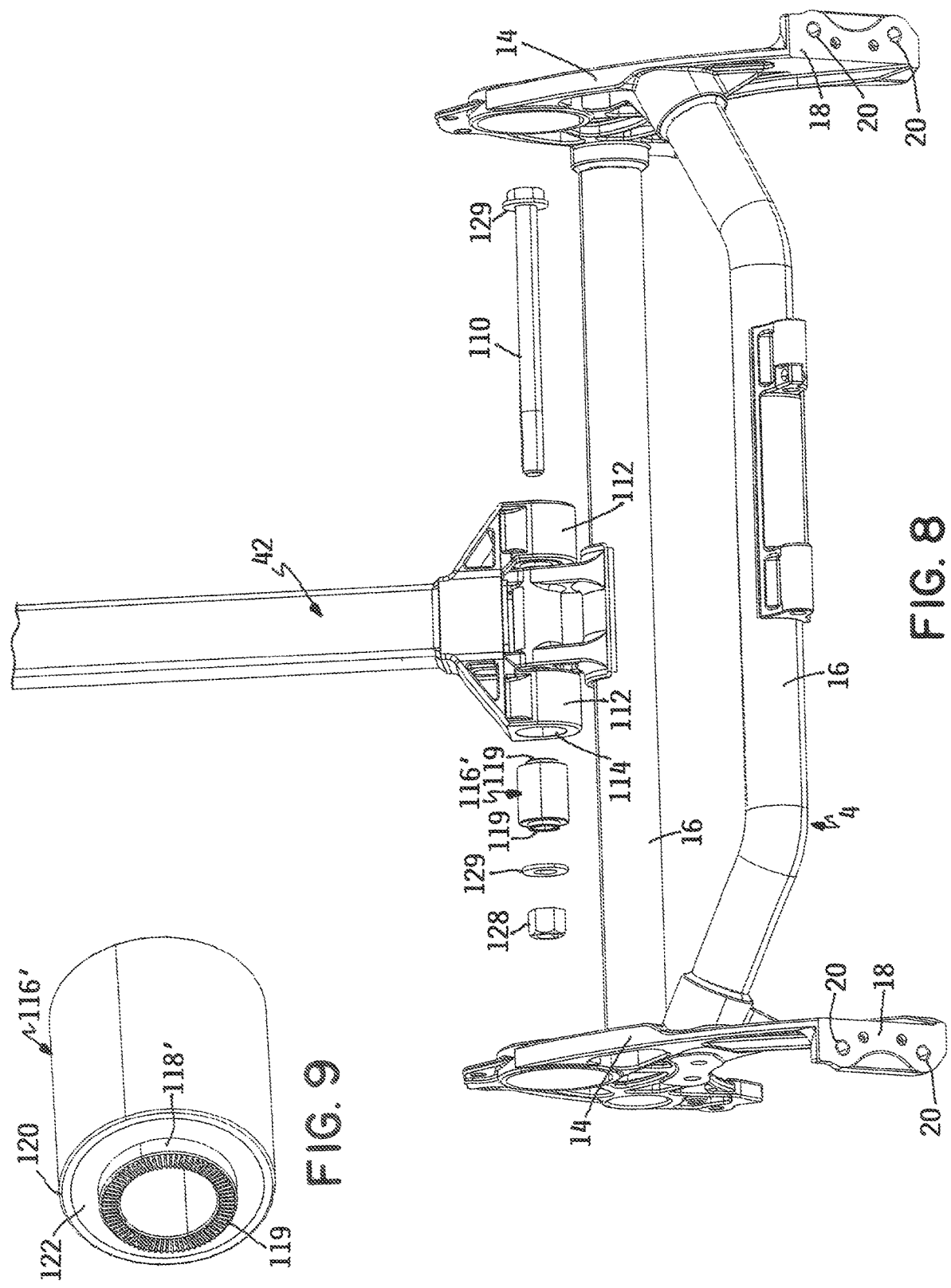

WALK REEL MOWER WITH COMMON MOUNT

TECHNICAL FIELD

This invention relates to a walk reel mower having a rotatable cutting reel that sweeps grass against a sharpened bedknife for shearing the grass against the bedknife.

BACKGROUND OF THE INVENTION

Walk reel mowers for mowing grass at low heights of cut on the greens of golf courses are known and are commonly referred to as greens mowers. Such mowers typically carry either a fixed head reel cutting unit that is fixed to the frame of the mower or a flex head reel cutting unit that can move relative to the frame of the mower to follow ground contours independently of the frame of the mower. If a user wished to have mowers with both types of cutting units for use in different areas or mowing situations, the user would have to buy two complete mowers to do so. This can be costly particularly if the need for one cutting unit is more limited in nature than the other cutting unit.

The user of a walk reel mower operates the mower while standing on the ground behind the mower and while gripping the handle of an upwardly and rearwardly extending handle assembly. The handle assembly can be pivotally adjusted about a horizontal axis on the frame of the mower to lift the handle upwardly for a taller user and to lower the handle downwardly for a shorter user. However, after such an adjustment, the taller user must stand closer to the frame of the mower and thus closer to the rear traction drum that propels the mower in order to grip the handle. Conversely and counter-intuitively, the shorter user must stand farther from the frame of the mower and thus farther from the rear traction drum that propels the mower in order to grip the handle. This is not desirable for many such users.

In using a walk reel mower to mow the grass on a golf green, the user typically makes a plurality of side-by-side cutting passes across the length or width of the green. At the end of each cutting pass as the mower travels onto the apron of the green, the user must turn the mower around 180° to line the mower up for the next cutting pass. Some users must slow the mower down while reversing its direction to avoid having to walk much faster or even run to keep up with the handle assembly during the direction reversing operation. The user typically retards the throttle to slow the mower down while it is being lined up for the next cutting pass. However, this requires the throttle to be manually restored by the user to the nominal position that establishes the desired ground speed of the mower during a grass cutting operation at the beginning of the next cutting pass. Some users find it bothersome or difficult to use the throttle in this way given the number of cutting passes that must be made.

Finally, in order to restore the proper edge interface between the helical blades of the rotatable cutting reel and the cutting edge of the bedknife, some users find it desirable to periodically backlap the cutting reel. This involves running the cutting reel in reverse relative to the bedknife with a grinding compound inserted at the edge interface. In some instances, backlapping is done by removing the entire cutting unit from the mower and inserting it into a separate machine that runs the reel in reverse. In other instances, a separate motor of some type can be coupled to the reel to run the reel in reverse with the cutting unit remaining on the mower during the backlapping operation. However, these prior art backlapping operations require additional or expensive equipment that is not found on a walk reel mower having a mechanically driven cutting reel.

SUMMARY OF THE INVENTION

One aspect of this invention relates to a walk reel mower which comprises a traction frame which mounts a prime mover. The traction frame carries at least one ground engaging drive member that is operatively powered by the prime mover to self-propel the traction frame over the ground. A rotatable cutting reel rotates about a substantially horizontal axis. The cutting reel is operatively powered by the prime mover for pushing grass against a bedknife for cutting the grass. A handle assembly extends rearwardly and upwardly from the traction frame. The handle assembly comprises a lower support that is operatively coupled to the traction frame and an upper mount that carries a handle which is gripped by a user during operation of the mower to guide and manipulate the mower. The upper mount is telescopically movable relative to the lower support to raise or lower the handle relative to the ground to adjust the height of the handle above the ground to suit users of different heights who walk on the ground behind the traction frame while operating the mower.

Another aspect of this invention relates to a walk reel mower which comprises a traction frame which mounts a prime mover. The traction frame carries at least one ground engaging drive member that is operatively powered by the prime mover to self-propel the traction frame over the ground. A rotatable cutting reel rotates about a substantially horizontal axis. The cutting reel is operatively powered by the prime mover for pushing grass against a bedknife for cutting the grass. A handle assembly extends rearwardly and upwardly from the traction frame. The handle assembly includes a handle which provides a substantially horizontal grip member that is gripped by a user during operation of the mower to guide and manipulate the mower. A movable control is carried on the handle assembly for motion relative to the handle between a first position in which the control is spaced from the grip member for disengaging the traction drive and a second position in which the control is closer to the grip member for engaging the traction drive such that a ground speed of the traction frame in the second position of the control is a nominal speed selected by the user. The control is movable in a range of motion between the first and second positions of the control that is large enough to permit the user to move the control into at least one intermediate position between the first and second positions to produce a reduced ground speed greater than zero but less than the nominal ground speed to allow the user to temporarily slow the traction frame down.

Yet another aspect of this invention relates to a walk reel mower which comprises a traction frame which mounts a prime mover. The traction frame carries at least one ground engaging drive member that is operatively powered by the prime mover to self-propel the traction frame over the ground. A rotatable cutting reel rotates about a substantially horizontal axis. The cutting reel is operatively powered by the prime mover for pushing grass against a bedknife for cutting the grass. A handle assembly extends rearwardly and upwardly from the traction frame. The handle assembly includes a handle that is gripped by a user during operation of the mower to guide and manipulate the mower. The handle assembly has a lower end that is connected to the traction frame by a pivot connection that forms a substantially horizontal pivot axis on the traction frame about which the handle assembly may pivot. At least one resilient isolator acts in shear between the handle assembly and the traction frame.

A further aspect of this invention relates to a walk reel mower which comprises a traction frame which mounts a prime mover. The traction frame carries at least one ground engaging drive member that is operatively powered by the prime mover to self-propel the traction frame over the ground. A handle assembly extends rearwardly and upwardly from the traction frame. The handle assembly includes a handle that is gripped by a user during operation of the mower to guide and manipulate the mower. A common mount is adapted to attach a fixed head reel cutting unit to the traction frame or to alternatively attach a carrier frame of a flex head reel cutting unit to the traction frame.

A still further aspect of this invention comprises a method of backlapping a reel cutting unit of a walk reel mower. The method comprises providing a walk reel mower having a traction frame which carries a traction drive to self-propel the traction frame over the ground by driving first and second laterally spaced transport wheels rotatably carried on the traction frame, providing a reel cutting unit having a rotatable cutting reel that is rotated by a reel drive in a first direction for pushing grass against a bedknife for cutting the grass, positioning the traction frame relative to a support surface such that the transport wheels are placed out of driving contact with the support surface, inserting an idler wheel into a driving relationship with the reel drive with the idler wheel having frictional driving contact with the first transport wheel, operating the traction drive while the reel drive is inoperative to cause the idler wheel to drive the cutting reel in a second direction that is opposite to the first direction, and conducting a backlapping operation while the cutting reel is being driven in the second direction.

BRIEF DESCRIPTION OF THE DRAWINGS

This invention will be described more fully in the following Detailed Description, when taken in conjunction with the following drawings, in which like reference numerals refer to like elements throughout.

FIG. 8 is an enlarged, partially exploded, front perspective view similar to FIG. 7 of a second embodiment of a floating connection between the bottom of the handle assembly and the traction frame of the mower;

FIG. 9 is an enlarged perspective view of the type of resilient isolator used in the second embodiment of the floating connection shown in FIG. 8;

DETAILED DESCRIPTION

Overview

Figure 1:
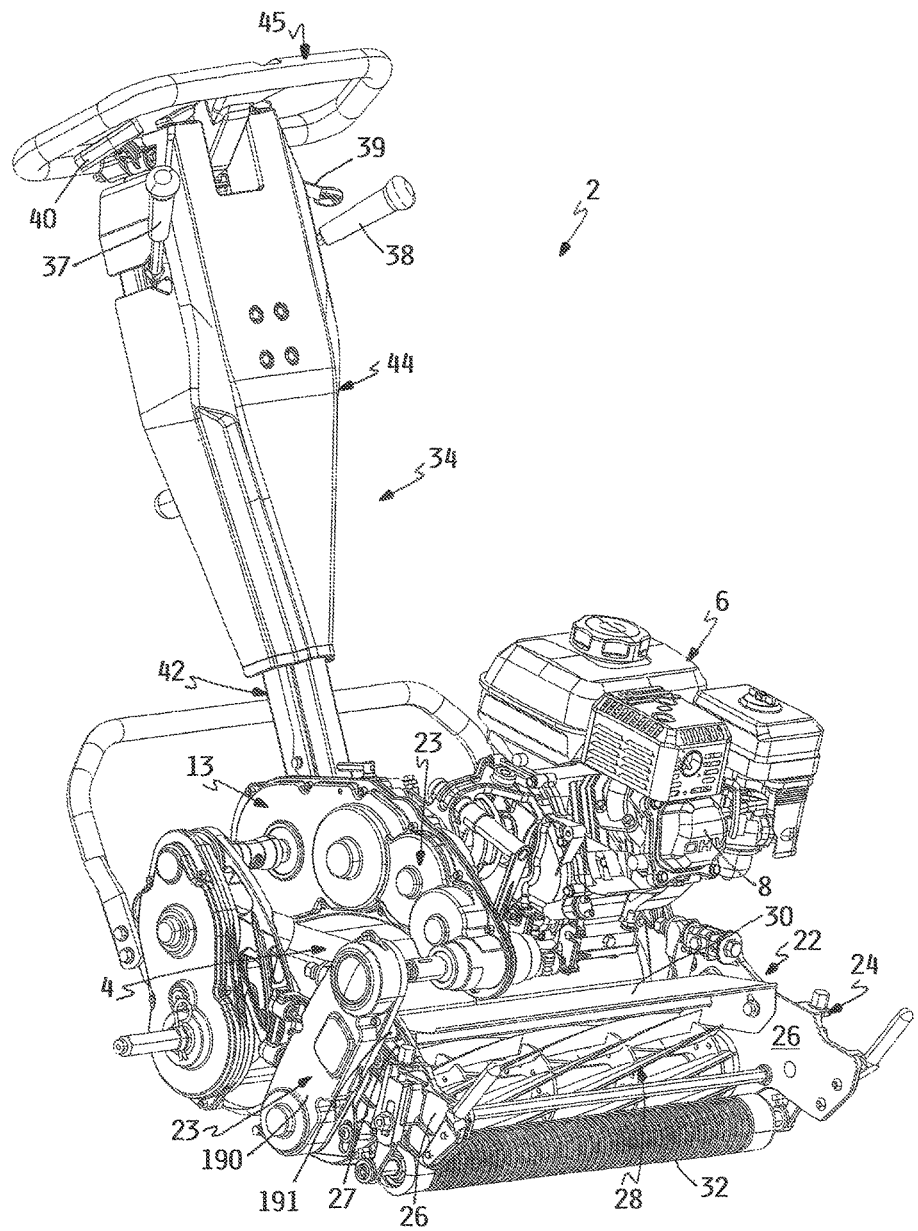
FIG. 1 is a front perspective view of one embodiment of a walk reel mower according to this invention.
Figure 2:
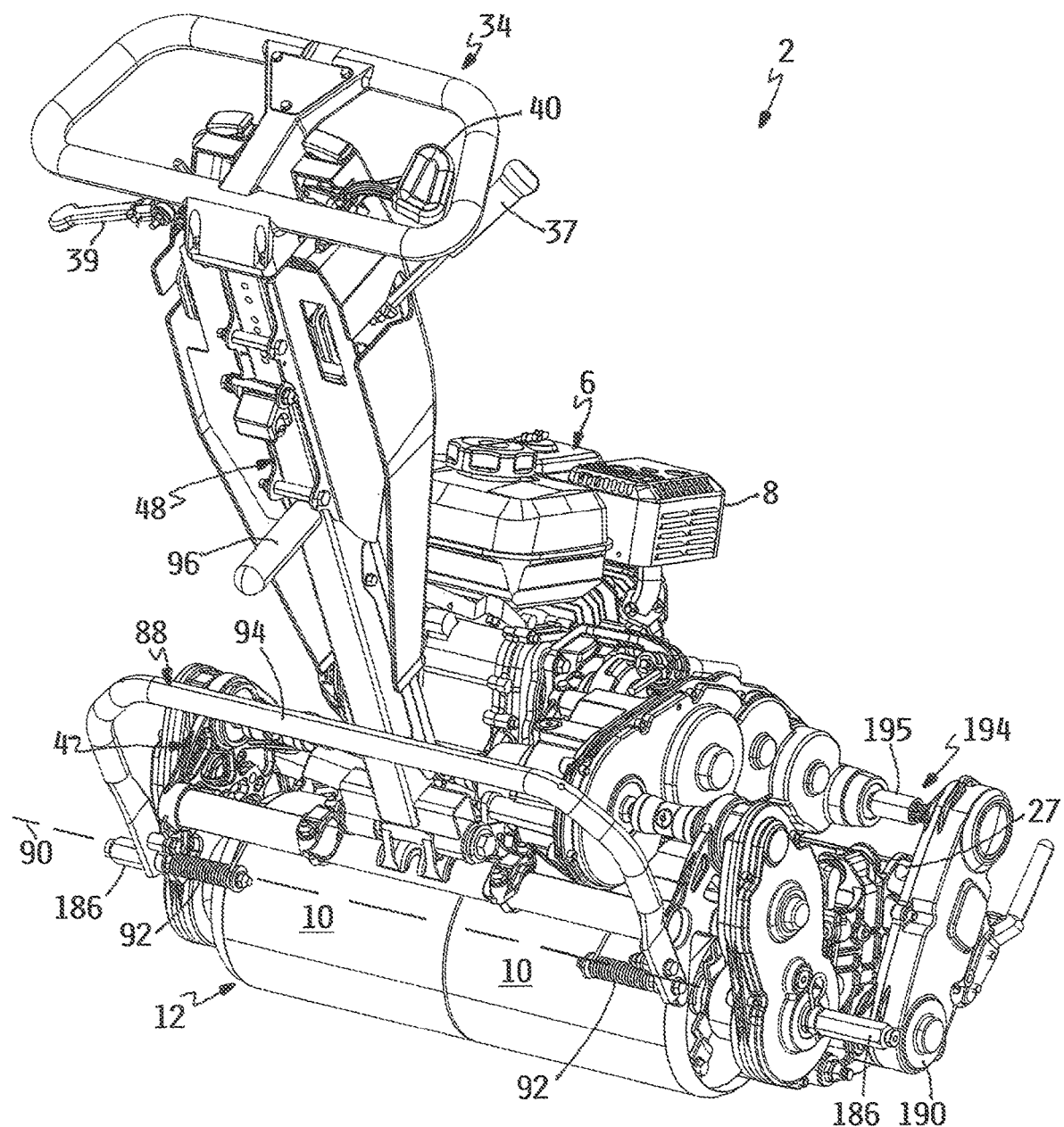
FIG. 2 is a rear perspective view of the mower of FIG. 1.

Referring first to FIGS. 1 and 2, one embodiment of a walk reel mower according to this invention is illustrated generally as 2. Mower 2 comprises a traction frame 4 which carries a prime mover 6 for providing power. Prime mover 6 may comprise an internal combustion engine 8 as shown in FIG. 1. Alternatively, other prime movers 6 may also be used, such as an electric motor or motors powered by a battery pack or powered by a hybrid system comprising an engine/generator and battery pack.

Traction frame 4 carries a pair of ground engaging drive members that rotate about a substantially horizontal axis to self-propel traction frame 4 over the ground. In one embodiment and as best shown in FIG. 2, the drive members are the left and right halves 10 of a traction drum 12 carried at the rear of traction frame 4. Traction drum 12 extends laterally substantially across the entire width of traction frame 4. Drum halves 10 can be rotated by an external or internal differential in a manner known in the art to allow drum halves 10 to rotate at different speeds during a turn of mower 2. Alternatively, drum halves 10 of traction drum 12 could be replaced with a pair of laterally spaced left and right drive wheels carried at the rear of traction frame 4 on the opposite sides thereof.

As best shown in FIG. 8, traction frame 4 comprises a pair of laterally spaced side members 14 that are rigidly connected together by laterally extending front and rear cross tubes 16. Prime mover 6 is supported atop traction frame 4 in any suitable manner, e.g. by being clamped or otherwise mounted to cross tubes 16. A front, forwardly facing end of each side member 14 is formed as a mounting surface 18. Each mounting surface 18 has a plurality of apertures 20 for receiving fasteners for mounting a reel cutting unit 22 thereto in a manner to be described in more detail hereafter.

Reel cutting unit 22 is well known in the art and comprises a frame 24 having spaced side plates 26 between which a cutting reel 28 is rotatably journalled for rotation about a substantially horizontal axis. Reel 28 comprises a plurality of circumferentially spaced, helical blades that push standing blades of uncut grass against a sharpened cutting edge of a laterally extending bedknife (not shown) to cut the grass in a shearing action. Cutting unit frame 24 further comprises a top wall 30 and an arcuate rear shield (not shown) that carries the grass clippings generated by the shearing action up and around the back side of reel 28 to project the clippings forwardly beneath top wall 30. A grass collector (not shown) may be attached forwardly of reel 28 to collect such grass clippings. Finally, a laterally extending front roller 32 is rotatably journalled between side plates 26 of cutting unit frame 24 to support mower 2 for rolling over the ground in conjunction with the support provided by traction drum 12.

Alternatively, in some embodiments of mower 2, cutting reel 28 and its cooperating bedknife as well as the arcuate rear shield and the top wall 30 that projects grass clippings forwardly beneath top wall 30 over reel 28 may be mounted between appropriately shaped and extended side members 14 of traction frame 4 rather than being part of a separable reel cutting unit 22. In this alternative, the front roller 32 would be rotatably journalled between side members 14 of traction frame 4 to support the front of mower 2.

A rearwardly and upwardly extending handle assembly 34 is held by a user during a grass mowing operation to guide and maneuver mower 2. The user walks on the ground behind mower 2 during operation. Various mower controls are carried on handle assembly 34 which can be reached by the user to initiate various functions. These controls include a right pivotal lever 37 for engaging and disengaging a traction drive 13 operatively powered by prime mover 6 for powering traction drum 12, a left pivotal lever 38 for engaging and disengaging a reel drive 23 operatively powered by prime mover 6 for powering cutting reel 28 with such reel drive 23 including a gearbox 190 mounted to one side plate 26 of cutting unit frame 24, a parking brake control 39 and an engine throttle control 40. This general type of handle assembly 34 and such controls 37-40 are typical of a walk reel mower 2 which forms the basis for various improvements which will now be described in the following sections hereof.

The Telescopic Handle Assembly

Figure 3:
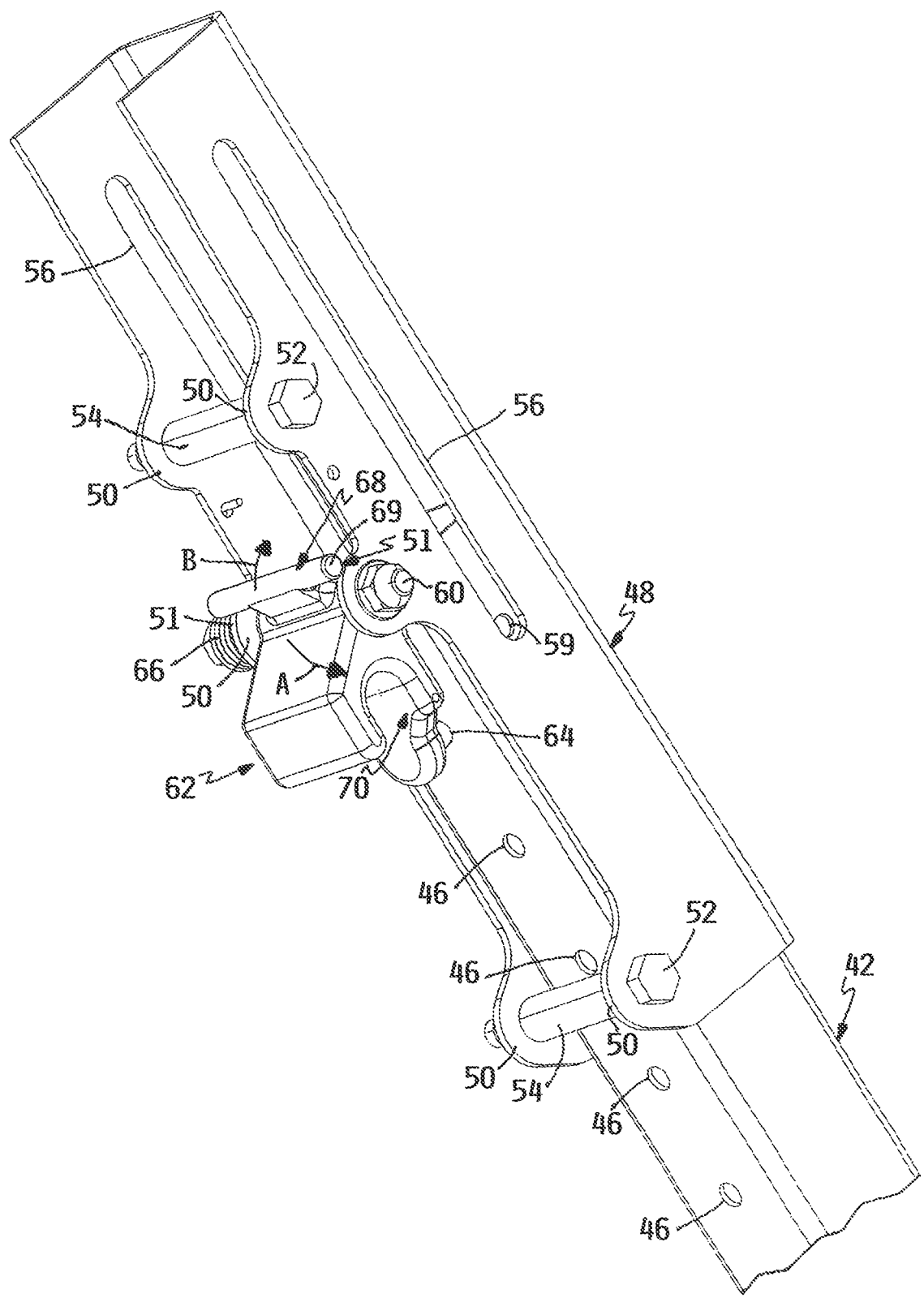
FIG. 3 is a rear perspective view of a portion of a handle assembly of the mower of FIG. 1, particularly illustrating telescopic upper and lower parts of the handle assembly for allowing the user to selectively adjust the height of the handle assembly above the ground.

As shown in FIGS. 1 and 2, handle assembly 34 comprises a two part telescopic assembly including a lower support 42 and an upper mount 44 that telescopes upwardly and downwardly over support 42. Upper mount 44 carries a handle 45 at its upper end which is gripped by the user. The lower end of support 42 is coupled to traction frame 4 in a manner described hereafter. As shown in FIG. 3, support 42 comprises a square or rectangular, hollow post or tube having an upper end that carries a plurality of vertically spaced apertures 46 thereon. The interior of mount 44 includes a U-shaped channel 48 that fits down over the upper end of support 42 to provide a telescopic sliding interface between support 42 and mount 44.

As further shown in FIG. 3, the free lower edges of the opposite side walls of U-shaped channel 48 have three pairs of protruding tabs 50 that are spaced apart along the length of channel 48. The upper and lower pairs of tabs 50 carry bolts 52 which mount cylindrical bushings 54 extending between tabs 50 of channel 48. The spaced bolts 52 and bushings 54 provide strength and rigidity to the channel shape of channel 48 to thereby facilitate movement of channel 48 on support 42 without channel 48 twisting or flexing.

Figure 6:
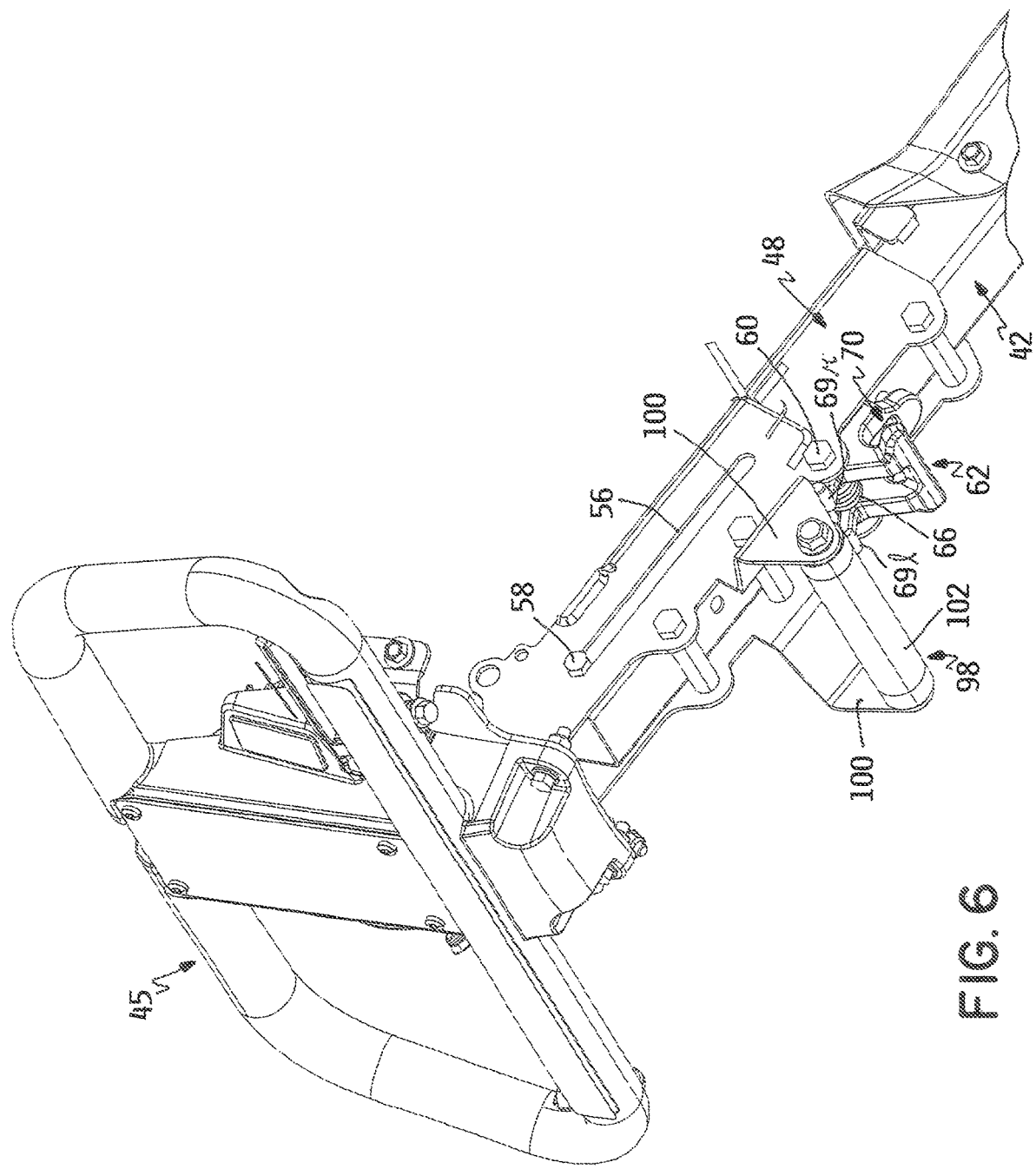
FIG. 6 is a rear perspective view of a portion of the handle assembly of the mower of FIG. 1, particularly illustrating the telescopic upper and lower parts of the handle assembly and an alternative embodiment of a latch and a kickstand assist handle provided on the upper part of the handle assembly.

Each opposite side wall of U-shaped channel 48 of mount 44 also has an elongated slot 56 that slidably receives an outwardly extending guide pin 58 on opposite sides of the upper end of support 42. See FIG. 6. In one embodiment, each guide pin 58 comprises the shank of a machine screw or bolt that is threaded into a tapped opening 59 in one side of the upper end of support 42. The slot/pin interface 56, 58 helps maintain proper alignment between support 42 and mount 44 as mount 44 is telescopically adjusted up and down relative to support 42 and provides physical end stops for the telescopic sliding motion between support 42 and mount 44. FIG. 3 shows opening 59 for guide pin 58 at the bottom of its corresponding slot 56 when mount 44 is in its uppermost position on support 42. When mount 44 is slid downwardly on support 42 to its lowermost position on support 42, guide pin 58 will be at the top of its corresponding slot 56 as shown in FIG. 6.

The central pair of tabs 50 on mount 44 carries a bolt 60 whose shank forms a pivot shaft for a latch 62. Latch 62 has an upwardly facing locking pin 64 that is adapted to enter any user selected aperture 46 in support 42. A torsion spring 66 has one end connected in any suitable manner to support 42 and the other end connected in any suitable manner to latch 62. Torsion spring 66 biases latch 62 relative to mount 44 in the direction indicated by the arrow A in FIG. 3 to engage locking pin 64 in an aperture 46 in support 42.

The back of latch 62 has a rigid stop 68 which is parallel to but offset from the axis of bolt 60 as shown in FIG. 3. In one embodiment, stop 68 preferably comprises a cylindrical bar 69 which rides on the arcuate rear edges 51 of the central pair of tabs 50 on the side walls of channel 48 as latch 62 is rotated in the direction of arrow B in FIG. 3 to disengage latch 62 or as latch 62 rotates back in the direction of arrow A under the bias of spring 66 to reengage latch 62. The diameter of the circle on which the front side of bar 69 travels in the direction of the arrows A or B is substantially the same as, namely, equal to or slightly greater than, the diameter of the circle on which the rear edges 51 of the central pair of tabs 50 lie.

Thus, the central pair of tabs 50 and their contacting relationship with bar 69 smoothly guide latch 62 during operation thereof to prevent latch 62 from becoming cocked to one side or the other about an axis parallel to channel 48. This ensures that locking pin 64 will smoothly disengage one aperture 46 in which it had been received and then smoothly reengage another selected aperture 46 after a height adjustment operation is completed. In addition, when latch 62 is rotated in the direction of arrow B in FIG. 3 and latch 62 becomes disengaged from support 42, bar 69 will engage against the lower edges of the side walls of channel 48 at the junction between the lower edges of the side walls of channel 48 and the rear edges of the central pair of tabs 50. This engagement causes the rotary motion of latch 62 to be stopped out against the channel 48 to hold latch 62 rigid against channel 48 to allow the user to thereafter use latch 62 to more effectively transfer force to channel 48, e.g., when the user wishes to lift mount 44 relative to support 42.

The front of latch 62 has a grip area which in one embodiment comprises an open recess 70 that faces downwardly and forwardly when latch 62 is in an engaged position. Recess 70 extends laterally through the width of latch 62 to be open through the opposite side walls of latch 62 as well as being open through the front of latch 62. Recess 70 is preferably large enough to receive at least the outer portions of a couple of the fingers on one hand of the user during a height adjustment of handle assembly 34.

To adjust the height of handle assembly 34 to suit the height of the user, e.g., to lengthen handle assembly 34 for a taller user or to shorten handle assembly 34 for a shorter user, the user need only grip latch 62 by placing the outer portions of fingers of one hand in recess 70. Then, the user need only pull rearwardly on latch 62 in the direction of arrow B in FIG. 3 to pull locking pin 64 out of whichever aperture 46 in which it had been previously received, to then pull up on handle 45 and/or latch 62 to lift mount 44 relative to support 42 or to allow mount 44 to lower by its own weight on support 42 while holding onto handle 45 and/or latch 44, and to then release latch 62 at a desired height along support 42. Torsion spring 66 will then be effective to automatically reseat locking pin 64 in a different aperture 46 along support 42 after a bit of additional up or down jockeying of mount 44 along support 42 by the user until the desired aperture 46 becomes aligned with locking pin 64.

The telescopic height adjustment of handle assembly 34 is advantageous compared to the prior art handle assemblies in the walk reel mower art that pivot about a horizontal axis on mower 2 to adjust their height above the ground. Such pivotal handle assemblies force a short user to move further away from mower 2 when the height of handle assembly 34 is lowered and a tall user to stand closer to mower 2 when the height of handle assembly 34 is raised. This is counter intuitive and contrary to what many short and tall users would prefer. By contrast, using the telescopic adjustment of this invention, when the height of handle 45 above the ground is appropriate for a short user, the user is positioned at a distance that is closer to traction drum 12 than is the case when handle assembly 34 is adjusted for a tall user. Thus, this invention provides the spacing result between the user and the traction drum that many users of walk reel mowers would prefer.

Figure 4:
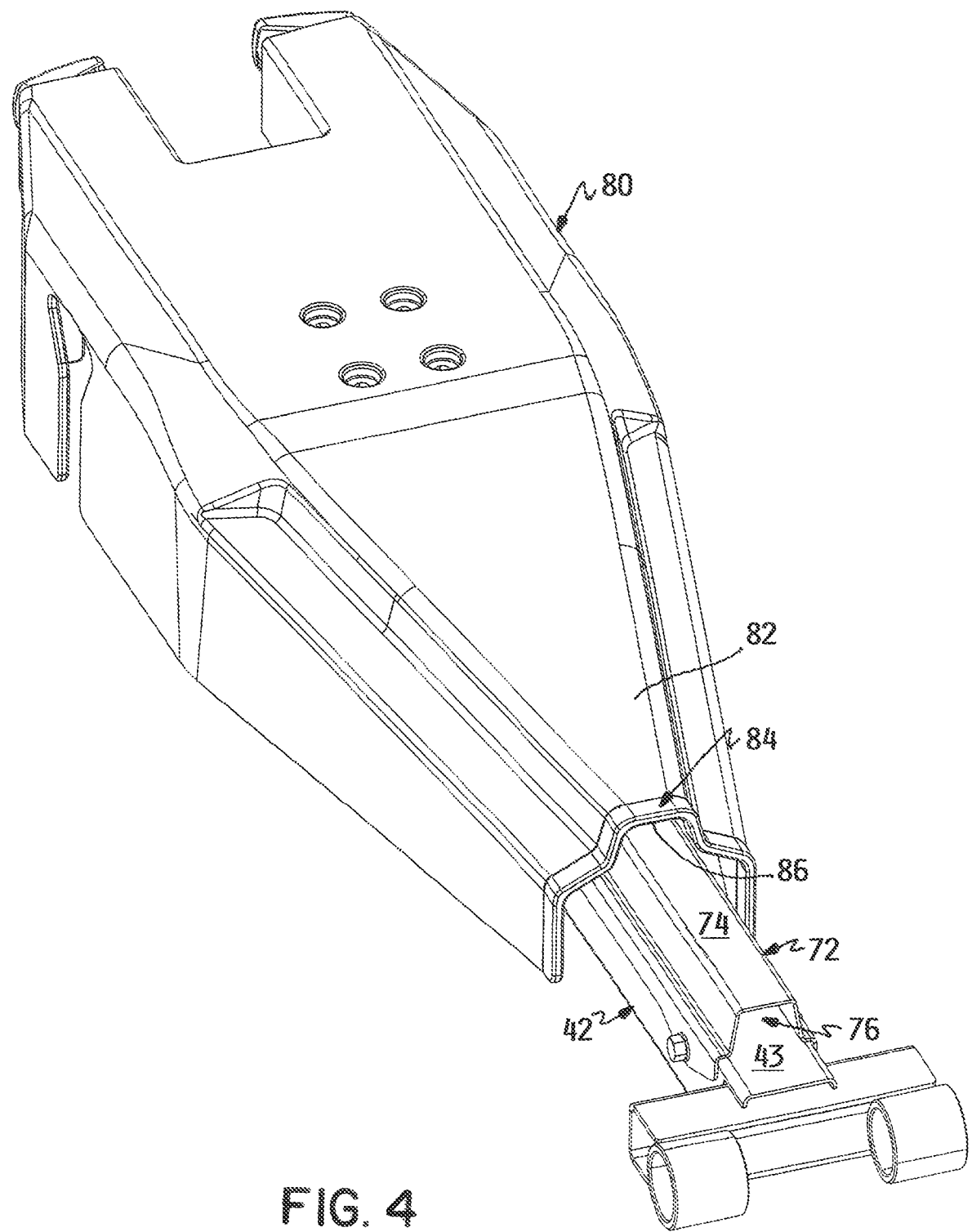
FIG. 4 is a front perspective view of another portion of the handle assembly of the mower of FIG. 1, particularly illustrating a cover on the upper part of the handle assembly which nests around a cable guide on the lower part of the handle assembly.

Referring now to FIG. 4, lower support 42 of handle assembly 34 has a U-shaped guide 72 which is bolted to the top of support 42. When so secured, the top wall 74 of cable guide 72 is spaced above the top wall 43 of support 42. Cable guide 72 extends over a lower section of support 42 and is open at the top and bottom ends thereof. Thus, the spacing between walls 74 and 43 forms an open passageway 76 through which various control cables 78 (shown in FIG. 5 only), preferably Bowden cables, pass or extend as cables 78 extend from controls 37-40 near the top of mount 44 to the corresponding components on traction frame 4 which are operated by such controls 37-40. Since cable guide 72 and the passageway 76 formed thereby are external to support 42 but are nonetheless carried by support 42, cable guide 72 does not interfere with how support 42 is mounted on traction frame 4 as will be described hereafter. Cables 78 simply exit through the open bottom end of cable guide 72 to pass over the support mounting without interfering with the mounting.

As also shown in FIG. 4, mount 44 includes a protective shroud or cover 80 that encloses the inner components of mount 44, such as, but not limited to, the mountings for controls 37-40, the connections of cables 78 to controls 37-40, connections for a wiring harness, and the like. Cover 80 preferably, but not necessarily, comprises a one piece, molded plastic part. Cover 80 has a V-shaped lower portion 82 that terminates in a bottom end 84 that is shaped to nest around the sides of support 42 and the sides and top of cable guide 72. As mount 44 is telescopically adjusted upwardly and downwardly over support 42 throughout the range of possible adjusted positions, bottom end 84 of cover 80, particularly the central, downwardly facing U-shaped channel portion 86 thereof which nests around the upwardly extending cable guide 72 on support 42, will prevent cover 80 from becoming misaligned relative to support 42 during telescopic motion thereof. In addition, cover 80 is long enough so that the upper or entrance end of cable guide 72 is always hidden by cover 80 so that the entrance of cables 78 into cable guide 72 is also similarly hidden and protected regardless of the position of mount 44 on support 42.

Figure 5:
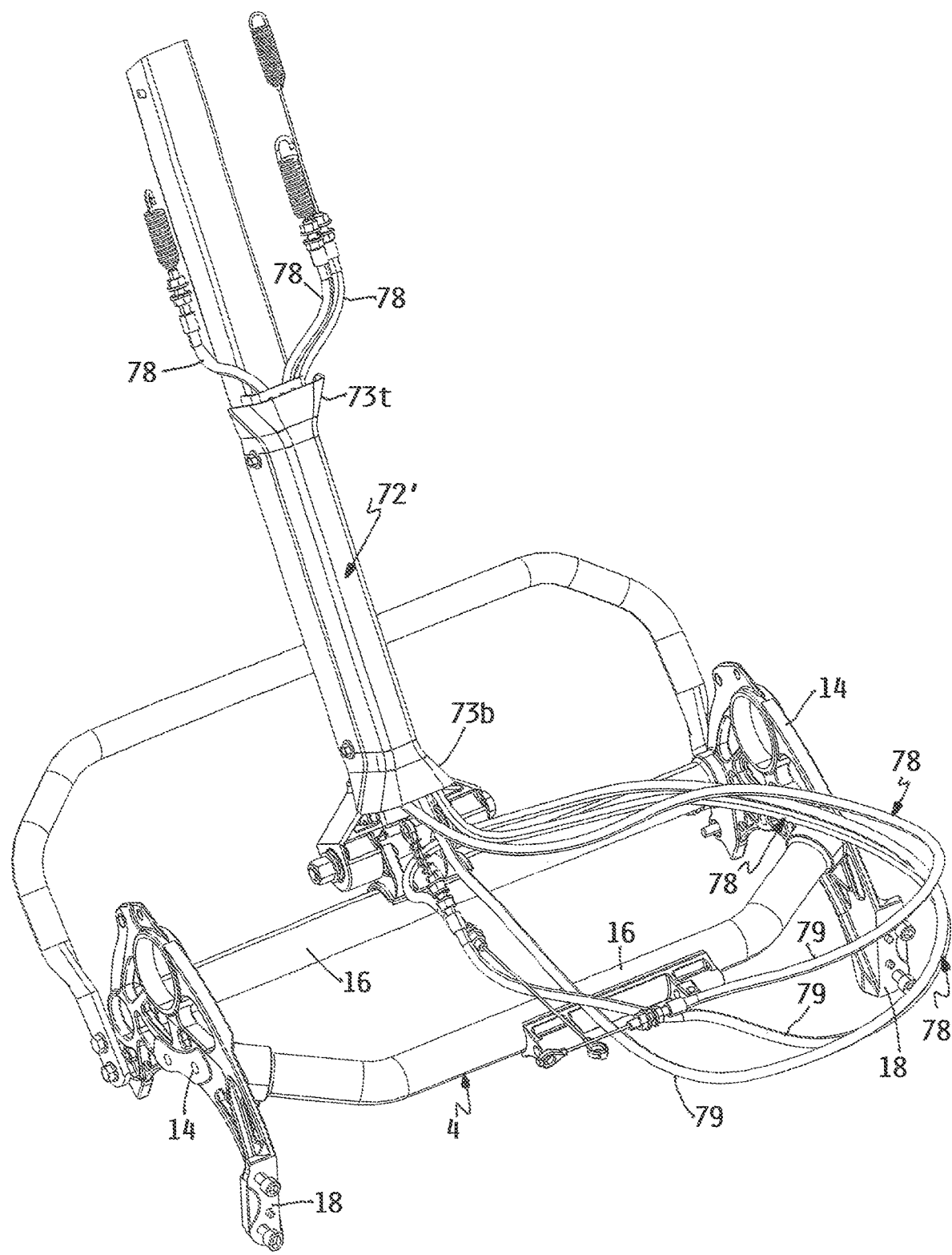
FIG. 5 is a front perspective view a portion of the mower of FIG. 1, particularly illustrating another embodiment of the cable guide on the lower part of the handle assembly and how the control cables extend therethrough and loop around the position of the prime mover to allow the control cable loops to contract or expand to accommodate telescopic adjustment between the upper and lower parts of the handle assembly.

Referring now to FIG. 5, cable guide 72' may in an alternative form have upwardly and outwardly flared top and bottom ends 73t and 73b so that the entrance to and the exit from passageway 76 has greater cross-sectional area than the portion of passageway 76 between the top and bottom ends 73t and 73b. This makes it easier for cables 78 to enter and exit from passageway 76 without being crimped or forced against a sharp edge. In a further variation, only bottom end 73b of cable guide 72' is outwardly flared with top end 73t being open but having the same cross-sectional area as passageway 76.

Moreover, upon exiting through the flared bottom end 73b of cable guide 72, cables 78 are disposed in full or partial loops 79 around the location of the prime mover 6 on traction frame 4 with prime mover 6 having been removed from FIG. 5 for the sake of clarity. Cable loops 79 are generously sized such that they may expand or contract in size as need be as mount 44 is moved downwardly or upwardly, respectively, over support 42. The Applicants have found this to be an effective and simple way of arranging cables 78 to accommodate the telescopic motion of mount 44 along support 42 without disturbing the function of cables 78.

Referring to FIG. 2, a mower 2 of the type shown herein typically includes a pivotal kickstand 88 which is shown in its non-deployed position. The user can selectively rotate kickstand 88 about a horizontal pivot axis 90 against the tension of torsion springs 92 until the crossbar 94 of kickstand engages against the ground. In one embodiment, an assist handle 96 is rigidly mounted to the underside of support 42 of handle assembly 34 to allow the user to pull up on assist handle 96 as the user pushes down with his or her foot on crossbar 94 to deploy kickstand 88. Assist handle 96 is located below channel 48 of mount 44 to be fairly low on support 42, thus allowing the user to effectively lift upwardly on assist handle 96 using mostly his or her legs. Once kickstand 88 is fully deployed, traction frame 4 is rocked back somewhat over kickstand 88 to lift traction drum 12 up out of contact with the ground to allow a pair of transport wheels to be mounted on traction drum 12 in a manner known in the art.

Referring now to FIG. 6, an alternative embodiment of an assist handle for use in deploying kickstand 88 is shown generally as 98. Assist handle 98 is now carried on channel 48 of mount 44 between a pair of ears 100 with assist handle 98 forming a substantially horizontal, laterally extending grip member 102 on the bottom of channel 48. Assist handle 98 is located above and somewhat below the location of pivotal latch 62 with grip member 102 extending parallel to the pivot axis of latch 62. Assist handle 98 is considerably higher on handle assembly 34 than was true of assist handle 96, but the function of the two assist handles is much the same, i.e., to allow the user to lift upwardly on handle assembly 34 to help when kickstand 88 is being deployed. However, due to its higher location, assist handle 98 requires more upper body strength during kickstand deployment as opposed to the greater use of leg strength that may be employed using the lower assist handle 96.

However, assist handle 98 is preferably located close enough to latch 62 such that grip member 102 may be usefully employed by the user when telescopically adjusting mount 44 along support 42. If the user wishes to make a height adjustment of handle assembly 34, the user can reach down with his or her right hand and lay the user's thumb on top of grip member 102 while extending a remaining portion of the user's hand below grip member 102. Assist handle 98 is close enough to latch 62 that the user can insert some of the outer portions of the fingers of his or her right hand into recess 70 of latch 62 while maintaining contact with grip member 102 with his or her thumb. Then, the user can more easily pull upwardly and rearwardly on latch 62 to rotate latch 62 from a latched to an unlatched position simply by squeezing the fingers of the user's hand somewhat back toward the thumb as the thumb rests atop grip member 102. Thus, assist handle 98 anchors the user's hand to provide some leverage for the unlatching operation such that latch 62 can be unlatched simply by squeezing the user's hand together slightly as opposed to having to pull upwardly and rearwardly on latch 62 using a straight line motion of the user's forearm or arm. Moreover, assist handle 98 helps the user more easily locate latch 62 simply by feel, i.e. by reaching down and putting his or her thumb on top of grip member 102 while curling the rest of his or her hand around and forwardly under grip member 102.

FIG. 6 also illustrates a modified form of latch 62 in which the bar 69 that forms stop 68 of latch 62 is no longer a single continuous bar but is formed as separate, collinear left and right bars 69l and 69r on opposite side walls of latch 62. In addition, torsion spring 66 that biases latch 62 to its latched position is now more compactly mounted between the side walls of latch 62 around the shank of bolt 60 that forms the pivot axis of latch 62.

A given mower 2 according to this invention may be provided with either one of assist handles 96 or 98 or with both assist handles together. Assist handle 98 provides the unlatching advantages set forth above with respect to latch 62 and is located higher on handle assembly 34 for those users who would find assist handle 96 to be too low. Thus, a mower equipped with assist handle 98 only would suffice. However, for users who would prefer the low assist handle 96 as it allows the user to use more leg power in deploying kickstand 88 but would also prefer to have assist handle 98 available to ease the operation of latch 62, then providing both assist handles 96, 98 on the same mower, or optionally to allow the low assist handle 96 to be added to an existing mower having handle 98 as original equipment by screwing or otherwise fastening handle 96 to support 42 of the existing mower, would satisfy the needs of such a user.

The Floating Handle Assembly

Figure 7:
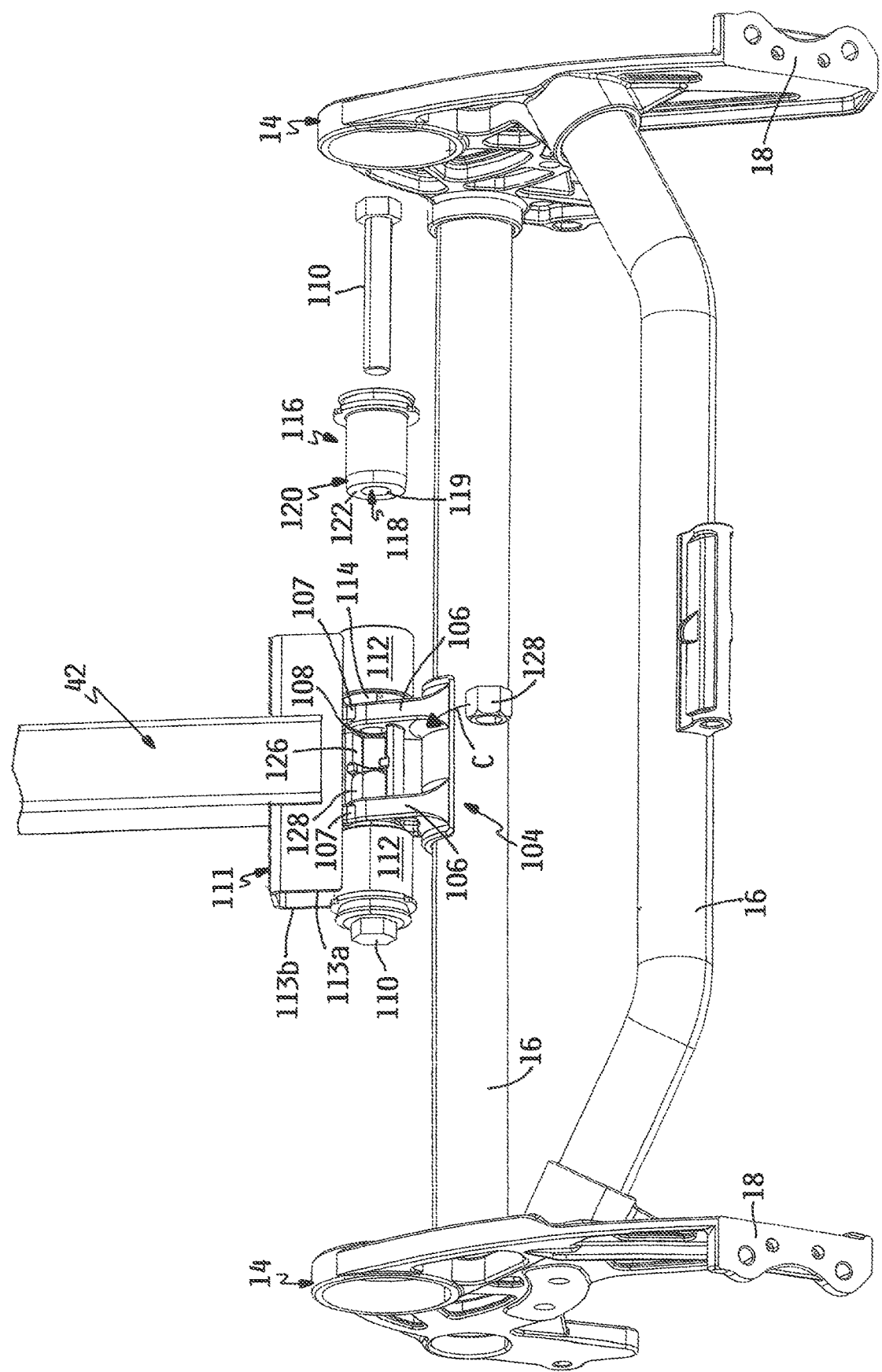
FIG. 7 is an enlarged front perspective view of a floating connection between the bottom of the handle assembly and the traction frame of mower, particularly illustrating a first resilient isolator thereof in an assembled form and a second resilient isolator thereof in an exploded form.
Figure 11:
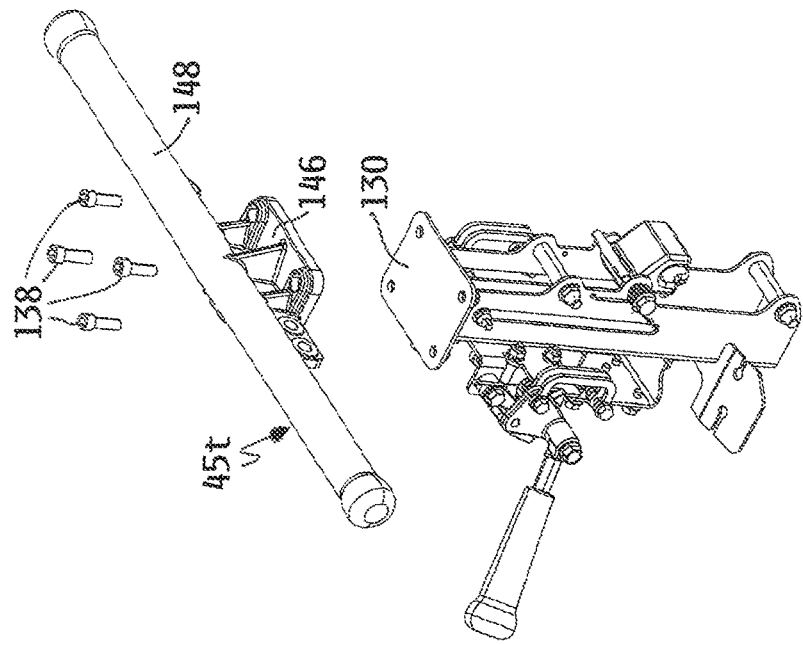
FIG. 11 is a front perspective view of a portion of the handle assembly of the mower of FIG. 1, particularly illustrating a T-handle mounted atop the handle assembly in place of the loop handle shown in FIG. 10.

Referring now to FIG. 7, rear cross tube 16 of traction frame 4 has a yoke 104 rigidly affixed thereto. Yoke 104 pivotally mounts the lower end of support 42 of handle assembly 34 to traction frame 4. Yoke 104 has a pair of upwardly extending arms 106 having through bores 108 for receiving a pair of bolts 110 through the sides of arms 106. The lower end of support 42 has a fixed, downwardly facing, U-shaped channel 111 that mounts a pair of laterally spaced and laterally extending cylindrical hubs 112. Hubs 112 are rigidly affixed to channel 111 in any suitable manner.

Arms 106 of yoke 104 have upwardly extending ears 107, the lower portions of which are visible in FIG. 7, which project up into the interior of channel 111 between the side walls 113a and 113b of channel 111. Ears 107 engage against side wall 113a or against another stop surface located inside channel 111 to limit downward pivotal motion of handle assembly 34 about the substantially horizontal pivot axis formed by bolts 110. Similarly, ears 107 engage against side wall 113b or against another stop surface located inside channel 111 to limit upward pivotal motion of handle assembly 34 about the substantially horizontal pivot axis formed by bolts 110. Thus, the pivotal motion of handle assembly 34 has a limited angular range between a lower stop (e.g. the contact between ears 107 and side wall 113a) which is hit as the operator presses downwardly on handle assembly 34 and an upper stop (e.g. the contact between ears and side wall 113b) which is hit as the operator lifts upwardly on handle assembly. Once either stop is hit, handle assembly 34 effectively becomes rigid with traction frame 4 as long as the operator keeps enough pressure on handle assembly 34 to keep the stop engaged.

Each hub 112 has a bore 114 that receives a resilient isolator 116 similar to that known in the automotive art as a control arm bushing. Isolator 116 comprises an inner cylindrical sleeve 118, a concentrically arranged outer cylindrical sleeve 120 spaced radially outwardly from inner sleeve 118 by an annular gap, and an elastomeric material 122 substantially filling in the annular gap between inner and outer sleeves 118, 120. The inner and outer diameters of elastomeric material 122 are affixed or bonded to inner and outer sleeves 118, 120, respectively.

Inner sleeve 118 has a bore 119 extending through the length of isolator 116. Each isolator 116 is inserted into a hub 112 of support 42 through a tight press fit by slightly oversizing the outer diameter of outer sleeve 120 relative to the inner diameter of bore 114 in hub 112 which receives such isolator 116. Bolts 110 pass through bores 119 in inner sleeves 118 of isolators 116 and through bores 108 in arms 106 to bolt isolators 116 to arms 106 of yoke 104. One side of yoke 104 is open to expose a partial hex-shaped channel 126 into which the nuts 128 that hold bolts 110 may be slipped, as indicated by the arrow C in FIG. 7 with respect to one nut 128. When nuts 128 are installed in channel 126, nuts 128 are thereby held against rotation by channels 126 to ease the task of tightening bolts 110 into nuts 128.

Isolators 116 are assembled into hubs 112 by first press fitting isolators 116 into hubs 112 and by then tightening bolts 110 with such assembly actions being done while handle assembly 34 is held against the upper stop that limits the upward pivotal motion of handle assembly 34. The press fit of outer sleeves 120 of isolators 116 into hubs 112 is sufficiently tight such that any rotation of handle assembly 34 about its pivot axis will carry outer sleeves 120 of isolators 116 with it. When assembly of isolators 116 into hubs 112 is completed while handle assembly 34 is held against the upper stop, elastomeric material 122 in each isolator is in a rotationally unstressed state in which there is no shear force acting between inner sleeve 118 and outer sleeve 120.

Following such assembly of isolators 116, handle assembly 34 is then released from its engagement with the upper stop. The weight of handle assembly 34 will cause handle assembly 34 to pivot downwardly about the pivot axis of bolts 120 to a nominal operational position. This position is reached when the increasing shear force developed within the elastomeric material 122 in isolators 116 is sufficient to counterbalance the force created by the weight of the handle assembly acting through the lever arm between the center of gravity of handle assembly 34 and the pivot axis of bolts 120. The hardness of elastomeric material 122 is chosen such that the nominal operational position of handle assembly is reached shortly before handle assembly 34 hits the lower stop. In one embodiment of this invention, the nominal operational position is one in which handle assembly 34 is substantially closer to the lower stop than the upper stop.

The purpose of isolators 116 is to provide a simple but effective way of providing a floating motion of handle assembly 34. Excessive downpressure on handle assembly 34 by a user having a heavy hand or touch will be absorbed by isolators 116 through increasing shear in the elastomeric material 122 contained in isolators 116. The transmission of such excessive downpressure to traction frame 4 or reel cutting unit 22 carried by traction frame 4 will therefore be minimized. In turn, this isolates cutting unit 22 from the excessive downpressure such that such downpressure will not cause changes in the height of cut being provided by cutting unit 22. Given that reel cutting unit 22 is designed to deliver heights of cut measured in the small thousandths of an inch, this is not insignificant.

Accordingly, the limited pivotal floating movement of handle assembly 34 relative to the rest of mower 2 helps maintain a more uniform and consistent height of cut regardless of the different amounts of downpressure which different users might apply to handle assembly 34. While prior art mowers have attempted to address the same problem, many purported solutions to the problem involved the use of external opposing springs or external donut shaped members having some lost motion before engagement. By contrast, isolators 116 of this invention are encapsulated within the pivot hubs 112 of handle assembly 34 and are particularly effective because they act in shear rather than in compression or extension.

While isolators 116 help absorb excessive downpressure from a user with a heavy hand or touch, the fact that handle assembly 34 in its nominal operational position is near the lower stop allows the user to put further downpressure on handle assembly 34 to quickly reach the lower stop. This is advantageous in mower 2 since engagement with the lower stop makes handle assembly 34 rigid relative to traction frame 4 to allow the user to raise the front of mower 2 to lift reel cutting unit 22 up off the ground. This often has to be done in order to turn mower 2 around to cut grass in successive cutting pass in the opposite direction. While it is an advantage in having some floating motion to absorb the downpressure from a user having a heavy hand or touch, it is also an advantage to let the user get to the lower stop quickly whenever he or she needs to turn mower 2 around.

By contrast, it may not be as important to be able to get to the upper stop as quickly as the lower stop since the user only rarely needs to use handle assembly 34 with handle assembly 34 having been engaged with the upper stop. This is desirable when the user wants to use handle assembly 34 to lift upwardly or some reason on the rear of traction frame 4, such as when deploying kickstand 84. This is a relatively rare occurrence compared to the frequent need to turn mower 2 around while mowing an area of grass, such as a golf green, using adjacent cutting passes in opposite directions. This is the reason why in some embodiments the handle assembly 34 in its nominal operational position may be set closer to the lower stop than the upper stop. However, in other embodiments, the upper and lower stops could be set at approximately equal distances from the handle assembly 34 in its nominal operational position or the upper stop could be dispensed with entirely.

FIGS. 8 and 9 depict a second embodiment of the floating handle assembly of this invention. Isolators 116' of this embodiment are the same as isolators 116 except that inner sleeve 118' of each isolator 116' has a serrated ring 119 of laterally outwardly projecting teeth on each end thereof. FIG. 9 illustrates serrated ring 119 on a left end of inner sleeve 118' with there being an identical outwardly projecting ring 119 on the right end of inner sleeve 118' that is not visible in FIG. 9. Isolators 116' are held in the previously described tight press fit within hubs 112.

A single through bolt 110' passes through both hubs 112 and through isolators 116' that have been tightly pressed into bores 114 of hubs 112. When a nut 128 is sufficiently tightened onto the threaded end of bolt 110', the serrated ring 119 on the laterally outer end of inner sleeve 118' will be forced against the washer 129 adjacent to nut 128 in the case of one isolator 116' and against the washer 129 adjacent the head of through bolt 110' in the case of the other isolator 116'. Simultaneously, the serrated ring 119 on the laterally inner end of inner sleeve 118' of each isolator 116' will be forced against the laterally adjacent side of the corresponding arm 106. Effectively, rings 119 on opposite sides of inner sleeve 118' of each isolator 116' bite into and frictionally engage washer 129 and arm 106 with a force that is sufficient to hold inner sleeve 118' immovable relative to the bore 114 of arm 112 into which isolator 116' was pressed. This positive mechanical engagement to adjacent fixed structure at each end of the inner sleeve 118' of each isolator 116' ensures that both inner sleeve 118' and outer sleeve 120 are rotationally immovable within bore 114 to maximize the effectiveness of elastomeric material 122 to permit only a desired limited degree of rotational pivoting motion of handle assembly 34 relative to traction frame 4.

The Interchangeable Handles

Figure 10:
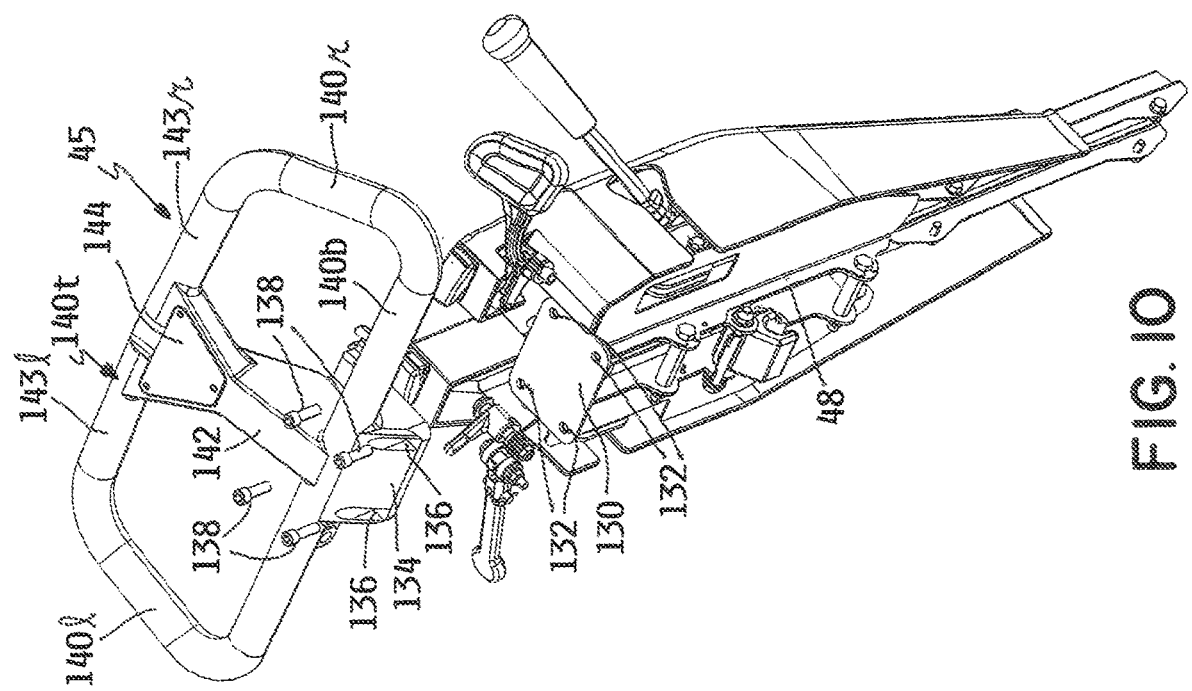
FIG. 10 is a rear perspective view of a portion of the handle assembly of the mower of FIG. 1, particularly illustrating a loop handle mounted atop the handle assembly.

Referring to FIG. 10, U-shaped channel 48 of upper mount 44 of handle assembly 34 is topped with a generally upwardly facing mounting plate 130. Mounting plate 130 has a plurality of spaced apertures 132. In one embodiment, handle assembly 34 includes a loop handle 45 having a base 134 that provides a downwardly facing, substantially planar mounting surface that may be abutted face-to-face with mounting plate 130. Base 134 of loop handle 45 is also provided with a plurality of apertures 136 in a pattern that matches apertures 132 on mounting plate 130. After base 134 of loop handle 45 and mounting plate 130 are abutted with one another and apertures 132, 136 in the two are aligned with one another, loop handle 45 may be secured to handle assembly 34 using a plurality of threaded fasteners 138, such as bolts, passing through the aligned apertures.

Loop handle 45 has top and bottom sides 140t, 140b joined together by left and right sides 140l and 140r to form a substantially enclosed periphery that surrounds a generally open interior 141. Loop handle 45 also includes a central column 142 that joins the middle portions of front and rear sides 140f, 140r of loop handle 45. Central column 142 divides the open interior 141 of loop handle 45 into left and right portions on either side of central column 142. Central column 142 also divides the substantially horizontal grip member formed by top side 140t of loop handle 45 into left and right hand grip areas 143l and 143r for the user to grip while operating mower 2.

If desired, an erasable whiteboard type material 144 may be mounted on top of central column 142. A supervisor may use an erasable marker compatible with whiteboard material 144 to mark instructions, e.g., the height of cut that is to be set, for the user to follow while mowing grass.

While a loop handle 45 is common in walk reel mowers, another handle that is known and that is popular with some users is a T-handle 45t. T-handle 45t comprises a base 146 forming the stem of the T shape. Base 146 is topped by a laterally extending, straight bar 148 that forms the arms of the T shape. The portions of bar 148 that extend beyond base 146 provide left and right hand grips for the user.

In order to make such T-handle 45t easily interchangeable with loop handle 45, base 146 of T-handle 45t forms a downwardly facing, substantially planar mounting surface that may be abutted face-to-face with mounting plate 130 in the same manner as base 134 of loop handle 45. Base 146 of T-handle 45t also has the same aperture pattern as mounting plate 130. Thus, it should be apparent that T-handle 45t may be mated to mounting plate 130 and fastened to mounting plate 130 using fasteners 138 in substitution for the handle 45t.

Since mowers of the type shown herein are very often owned and operated by golf courses for the close cutting of greens and similar uses, any given mower may be operated at different times by different employees of the golf course. The interchangeable handles 45, 45t as disclosed herein allows any given user to switch to a handle style that he or she prefers simply by unbolting the non-preferred handle and replacing it with the preferred handle. This can be done without disturbing or rerouting any of the operational controls 37-40 or the control cables 78 leading thereto as the interchangeable handles 45, 45t are not used for the mounting of such controls or cables. Accordingly, the customizable nature of the handle will be attractive to many purchasers of mowers since the purchaser need not forecast how many mowers must be purchased with different types of handles but may simply buy the right number of mowers with sufficient quantities of both styles of handle being available for use on the fleet of mowers.

The Traction Engaging Bail

Figure 14:
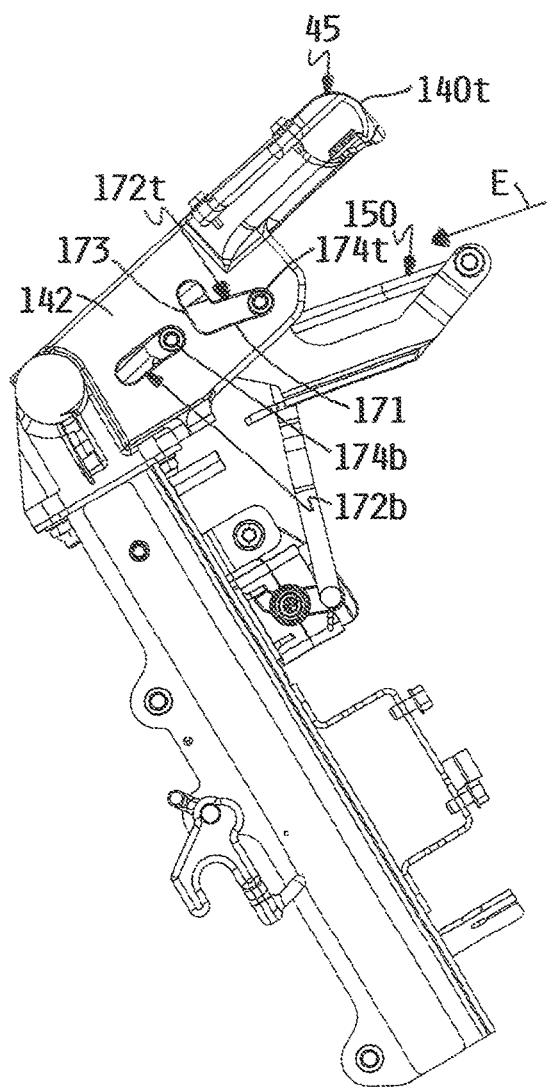
FIG. 14 is a cross-sectional side elevational view of what is shown in FIG. 10, particularly illustrating the positions of various pins on the traction bail as received in slots in the upper part of the handle assembly when the traction bail is in the drive disengaged position shown in FIG. 12.

In the embodiment of mower 2 shown in FIG. 1, control lever 37 on the right side of handle assembly 34 is a pivotal lever that is pulled back towards the user to disengage traction drive 13 and that is pushed forward away from the user to engage traction drive 13. As an alternative thereto, pivotal control lever 37 could be replaced with a pivotal control that requires two actions of the user to actuate traction drive 13. This option is illustrated in FIGS. 12-14.

Figure 12:
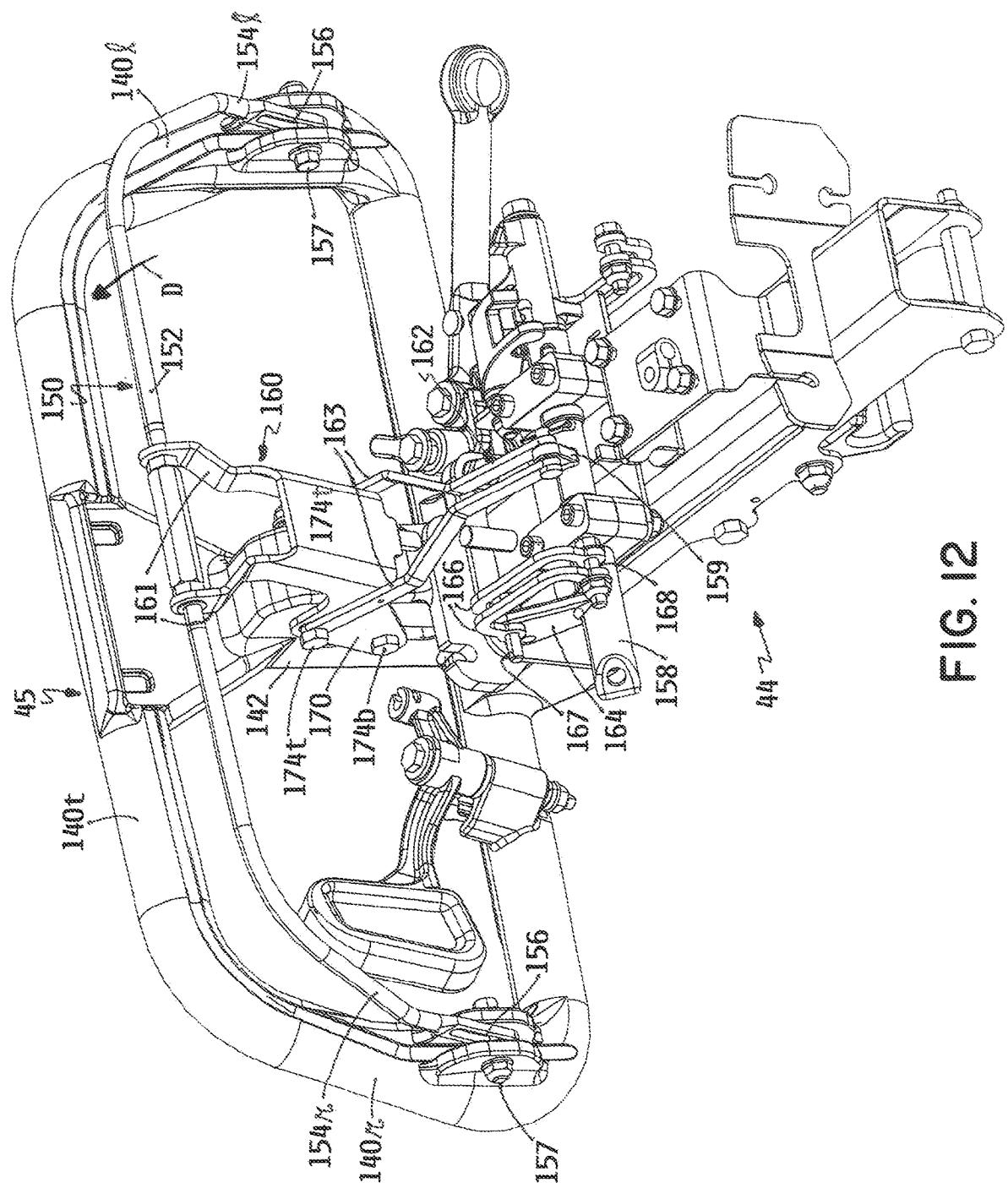
FIG. 12 is a front perspective view of the upper part of the handle assembly of the mower of FIG. 1 having the loop handle of FIG. 10, particularly illustrating a traction bail for engaging and disengaging the traction drive of the mower of FIG. 1.
Figure 13:
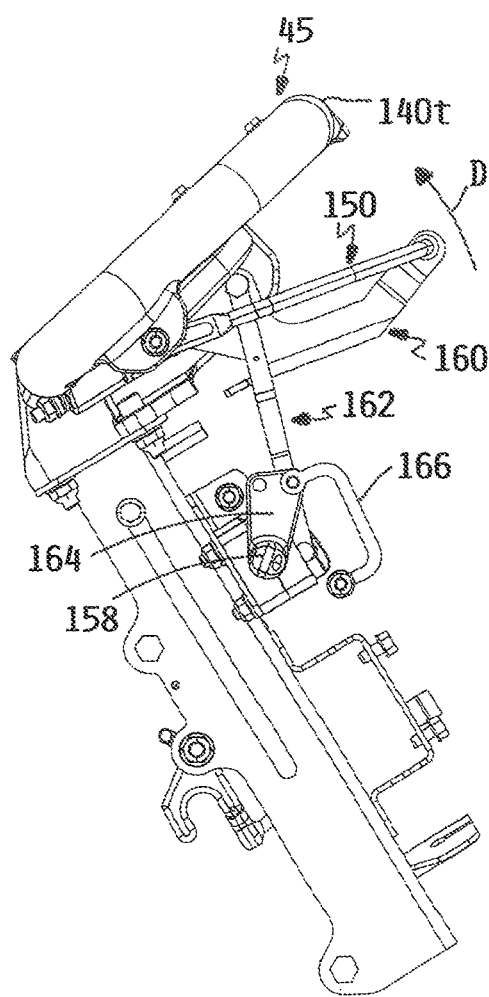
FIG. 13 is a side elevational view of the upper part of the handle assembly as shown in FIG. 12, particularly illustrating the traction bail of FIG. 12 in a drive disengaged position.

Referring first to FIG. 12, one embodiment of the two action pivotal control comprises a bail 150 that is substantially U-shaped having a top 152 from which laterally spaced left and right legs 154l, 154r extend. The shape of bail 150 conforms generally to the shape of top side 140t and left and right sides 140l and 140r of loop handle 45. The left and right legs 154l, 154r of bail 150 have free ends that include elongated slots 156. Slots 156 receive the shanks of bolts 157 carried on the left and right sides 140l and 140r of loop handle 45 to help stabilize bail 150 on loop handle 45. For example, if a user grips only one side of bail 150 with one hand and attempts to rotate bail 150 with an off-center force, slots 156 in the legs of bail 150 will prevent bail 150 from twisting relative to loop handle 45 to maintain top 152 of bail 150 generally parallel to top side 140t of loop handle 45 during motion of bail 150. Slots 156 and the shanks of bolts 157 form a first pin and slot connection that pivotally mounts bail 150 to handle 45. Alternatively, the relative positioning of slots 156 and bolts 157 could be reversed with slots 156 being provided in loop handle 45 and bolts 157 being located in bail 150.

Bail 150 is connected to a laterally extending, pivotal cross shaft 158 carried on upper mount 44 of handle assembly 34 by a first yoke 160 and a second yoke 162. First yoke 160 has a pair of arms 161 that pivotally attach first yoke 160 to top 152 of bail 150. Second yoke 162 has a pair of arms 163 that pivotally attach both to first yoke 160 as well as to a first tab 159 on cross shaft 158. When top 152 of bail 150 is pivoted towards top side 140t of loop handle 45 in the direction of the arrow D in FIG. 12, cross shaft 158 is also pivoted in the same direction by the rotational force exerted on cross shaft 158 by first yoke 160, second yoke 162 and first tab 159.

Cross shaft 158 includes a laterally spaced second tab 164 that rotates with cross shaft 158. Two U-shaped connecting links 166 are attached by a pivot pin 167 at first ends thereof to opposite sides of second tab 164. When so attached, second tab 164 is sandwiched between connecting links 166. The other ends of connecting links 166 carry a cross pin 168 that serves as an attachment point for one end of the inner wire of a Bowden cable 78 (not shown in FIG. 12).

The inner wire is slidable back and forth within an outer sheath or conduit of Bowden cable 78 in a known manner and is spring biased in a manner known in the art to bias bail 150 to the traction drive disengaged position as shown by the position of bail 150 in FIGS. 12-14. When bail 150 is pivoted towards top side 140t of loop handle 45 in the direction of the arrow D in FIG. 13, the pivoting induced in the various connecting members will pull rearwardly on connecting links 166 to pull the inner wire of the Bowden cable rearwardly against the tension of the spring to thereby activate traction drive 13 through a clutch (not shown). When bail 150 is subsequently released by the user, the spring force will automatically return bail 150 to the drive disengaged position in the manner of a deadman's handle.

In order to prevent inadvertent actuation of traction drive 13, bail 150 is not immediately pivotal towards the top side of loop handle 45. Instead, bail 150 must first be moved in an unlocking direction E that is generally perpendicular to the bail closing direction D. This is accomplished through the following additional structure.

Referring to FIG. 12, first yoke 160 that forms part of the overall linkage that operates on the traction drive control cable 78 has a pair of laterally spaced lower ears 170 that are located below attachment arms 161 that pivotally connect first yoke 160 to top 152 of bail 150. Ears 170 of first yoke 160 are nested around opposite sides of a portion of central column 142 of loop handle 45. As shown in FIG. 14, central column 142 has two through slots 172 that pass laterally through central column 142. Slots 172 include an L-shaped top slot 172t and a bottom slot 172b that has a slightly arcuate curvature.

Top and bottom bolts 174t, 174b pass laterally through circular apertures provided therefor in ears 170 of first yoke 160. Top bolt 174t passes into and through top slot 172t in central column 142. Bottom bolt 174b passes into and through bottom slot 172b in central column 142. When bail 150 is in the drive disengaged position thereof, each bolt 174 is received at the top of its corresponding slot 172 as shown in FIG. 14.

If a user were to simply grab top 152 of bail 150 and pivot it towards top side 140t of loop handle 45, this would be prevented by the engagement of top bolt 174t in the generally forwardly and vertically extending arm 171 of the L-shaped top slot 172t in central column 142 of loop handle 45. In order to close bail 150, the user must first place the fingers of his or her hands on top 152 of bail 150 and press bail 150 downwardly and rearwardly in the direction of the arrow E. As bail 150 moves in the direction of arrow E, top and bottom bolts 174t, 174b carried by ears 170 of first yoke 160 will reach the bottoms of the top and bottom slots 172t, 172b in loop handle 45. When this happens, top bolt 174t will become aligned with the upwardly and rearwardly extending lower arm 173 of the L-shape of top slot 172t. Bottom bolt 174t will also become aligned to be with the axis of bolts 157 that have now reached the upper ends of slots 156 in legs 154l, 154r of bail 150. Top bolt 174t received in top slot 172t forms a second pin and slot connection that prevents bail 150 from being pivoted in bail closing direction D until bail 150 is first displaced downwardly in bail unlocking direction E.

Thus, with bolts 174t, 174b respectively located at the lower ends of slots 172t, 172b, the user is now free to pivot bail 150 in the direction of the arrow D about the axis of bottom bolt 174b and bolts 157 since top bolt 174t will now simply move rearwardly within the lower arm 173 of the L-shape of top slot 172t, thus permitting such pivotal motion of bail 150. As bail 150 pivots within bottom slot 172b about the axis of bottom bolt 174b and bolts 157, bail 150 will quickly reach a position substantially directly contiguous to or abutting against the top side 140t of loop handle 45. In this drive engaged position of bail 150, the linkage connecting bail 150 to the inner wire of the Bowden cable 78 leading to the clutch of traction drive 13 will have also been pivoted to pull inwardly on the inner wire of the Bowden cable to actuate traction drive 13. Whenever the user wishes to disengage traction drive 13, he or she need only release bail 150 and the spring biasing supplied by the Bowden cable will automatically disengage traction drive 13, thereby bringing mower 2 to a halt.

The two actions needed to move bail 150 from its drive disengaged position to its drive engaged position are intuitive to many users or easily and quickly learned. For example, the user naturally grips bail 150 by placing the palms of his or her hands on the top side 140t of loop handle 45 and reaching forwardly to grab top 152 of bail 150 with his or her fingers resting on top of bail 150. In this position, the user's fingers are naturally placed where they need to be to push down on bail 150 in the direction of arrow E. The user will quickly learn or realize that a simple push down on bail 150 with the user's fingers is all that is needed to unlatch bail 150 to allow the subsequent pivoting of bail 150 in the direction of arrow D needed to close bail 150. Accordingly, the entire sequence of actions needed to engage traction drive 13, namely to first push down on bail 150 and then pull back on bail 150 after the downward motion of bail 150 stops, will neither be difficult for a user to learn nor easily forgotten by the user once learned.

The clutch (not shown) in traction drive 13 on which bail 150 acts may comprise clutch members that progressively contact one another or are tightened with respect to one another to engage traction drive 13 and that progressively release one another or become less tight to disengage traction drive 13. When bail 150 is fully pushed down in the direction of arrow E but is not yet pivoted in the direction of arrow D, the clutch members will be sufficiently out of contact with each other or sufficiently slack so that traction drive 13 does not power traction drum 12. After bail 150 is fully pivoted in the direction of arrow D, the clutch members will have sufficient contact with one another or will become tight enough so that traction drive 13 is driving traction drum 12 at the ground speed determined by the setting of engine throttle control 40. However, the user can cause the clutch members to only partially engage or tighten by holding bail 150 in a partially pivoted position in the direction of arrow D to select a lower than maximum ground speed for a given throttle setting.

This ability to partially slip the clutch in traction drive 13 to selectively lower the ground speed of mower 2 is very useful when turning mower 2 around at the end of a cutting pass. If a mower is turned around at the same speed as was used in the cutting pass, some users find that they have to speed up or even run somewhat to keep up with handle assembly 34 as the mower is turning around given the wider circle the user has to follow as opposed to the smaller circle mower 2 turns about. However, if the user simply lets pressure off bail 150 while keeping some pressure on bail 150, the user can progressively modulate the position of bail 150 to various intermediate positions that are between the off position of bail 150 and the fully engaged position of bail 150. In any of these intermediate positions, the clutch is slipped to different degrees to produce a range of lower ground speeds than when bail 150 is fully engaged relative to handle 45. Thus, the user can select a lower ground speed which allows the user to continue to walk rather than run as mower 2 is being turned to line up for a new cutting pass. Accordingly, the user can easily lower the ground speed of the mower 2 when turning mower 2 around without having to change the nominal ground speed that the user has set for use during a cutting pass since the setting of engine throttle control 40 can remain unchanged as the mower is turned around.

Bail 150 has been described above as being used to engage and disengage traction drive 13. In this capacity, it is an optional replacement for the typical control lever 37 normally used for this function as shown in mower 2 of FIG. 1. However, bail 150 may also be used along with the control lever 37 simply as a user presence control. In this function, bail 150 may be used as part of a prime mover enable/disable circuit with bail 150 needing to be closed to start or activate prime mover 6 and when released serving to disable or kill prime mover 6.

The Interchangeable Cutting Units

Figure 15:
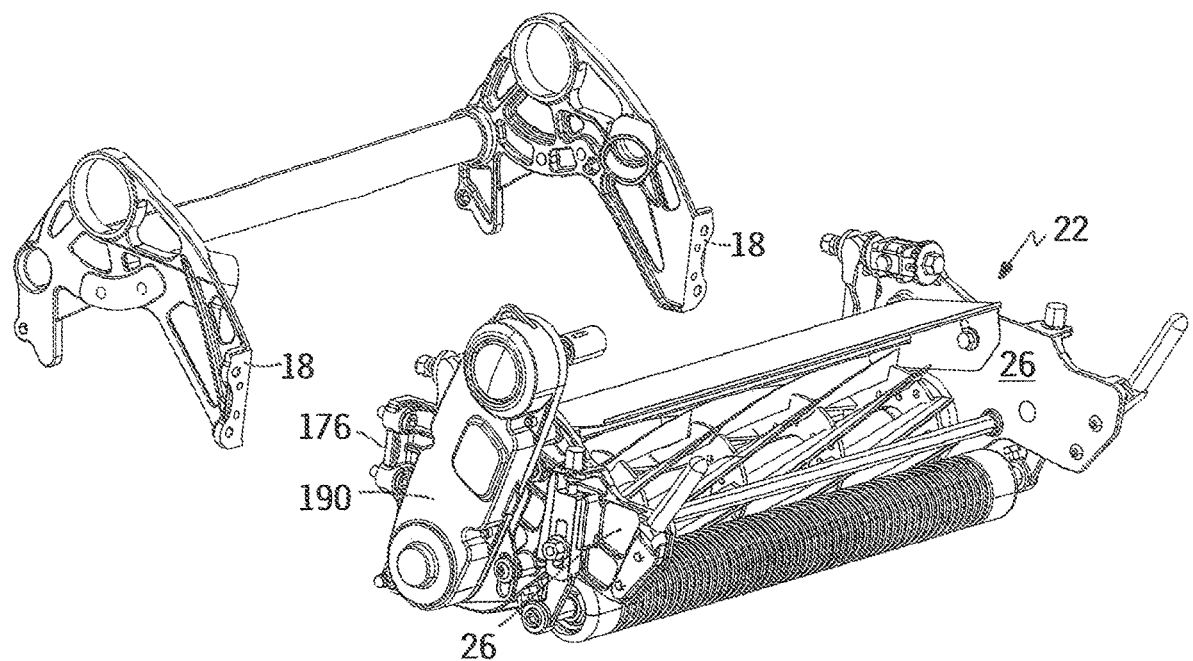
FIG. 15 is a front perspective view of a portion of the traction frame of the mower of FIG. 1 with a fixed head reel cutting unit being separated therefrom, particularly illustrating the mounting system for bolting the fixed head reel cutting unit to the traction frame of the mower of FIG. 1.

Referring now to FIG. 15, each side plate 26 of reel cutting unit 22 has a rearwardly facing mounting surface 176 that is designed to abut with a similar forwardly facing mounting surface 18 on each side member 14 of traction frame 4. Side plates 26 and side members 14 having matching apertures that allow them to be quickly and easily bolted together. When so mounted, reel cutting unit 22 as described earlier herein becomes a fixed head cutting unit since the ground contour following motion of cutting unit 22 relative to the turf is dependent on the motion of traction frame 4. The fixed head reel cutting unit 22 as shown in FIGS. 1 and 15 has no ground contour following motion that is separate from the ground contour following motion of traction frame 4.

Figure 16:
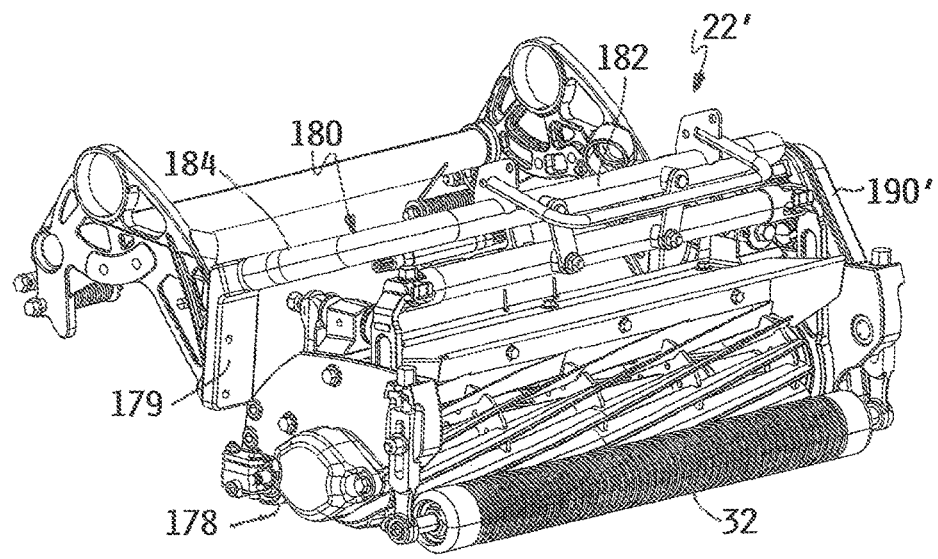
FIG. 16 is a front perspective view similar to FIG. 12 but showing a flex head reel cutting unit having been mounted to the traction frame of the mower of FIG. 1 using the same mounting system as shown in FIG. 12 such that the fixed head reel cutting unit of FIG. 12 and the flex head reel cutting unit of FIG. 13 may be interchangeably mounted on the mower of FIG. 1.

The reel cutting unit mount collectively provided by mounting surfaces 18 on side members 14 of traction frame 4 permits the fixed cutting unit shown in FIGS. 1 and 15 to be replaced with a flex head cutting unit 22' of the type well known in the art. Specifically, such a flex head cutting unit is described in U.S. Pat. No. 7,191,584, owned by The Toro Company, the assignee of this invention, which is hereby incorporated by reference. As shown in FIG. 16, such a flex head cutting unit 22' has a rear roller 178 in addition to its front roller so that it is self-supporting for movement over the ground. More significantly, cutting unit 22' is carried on the rest of mower 2 in a manner that allows cutting unit 22' to be independently movable in one or more degrees of freedom relative to the rest of mower 2 to have its own separate and independent ground following motion.

Referring further to FIG. 16, a generally U-shaped carrier frame 180 is provided having a crossbar 182 and two downwardly and rearwardly extending legs 184, one of which is visible in FIG. 15 with the other being hidden, that define the U-shape. The rear end of each leg 184 of carrier frame 180 is provided with a rearwardly facing, vertical mounting surface 179 that is similar to mounting surface 176 on fixed head cutting unit 22. Mounting surfaces 179 on carrier frame 180 may be abutted with the forwardly facing mounting surfaces 18 on traction frame 4 in the same manner as mounting surfaces 176 on fixed head cutting unit 22. This allows carrier frame 180 of flex head cutting unit 22' to be bolted to traction frame 4 in the same manner as side plates 26 of fixed head cutting unit 22.

A flex head cutting unit 22' of the type shown in the '584 patent, previously incorporated by reference herein, is carried on carrier frame 180 for roll and pitch relative to carrier frame 180, and thus relative to traction frame 4, about a horizontal longitudinal axis and a horizontal lateral axis, respectively. While motion in two degrees of freedom is preferred, motion in one degree of freedom, i.e. either roll or pitch, could also be provided by carrier frame 180. Like fixed head cutting unit 22, flex head cutting unit 22' includes a gearbox 190' that is mounted on the opposite side plate of flex head cutting unit 22' compared to its position on fixed head cutting unit 22. In this case, the overall reel drive 23 will include a flexible drive shaft (not shown) for connecting gearbox 190' to the remaining portion of reel drive 23 supported on traction frame 4 so as to accommodate the motion of flex head cutting unit 22' relative to traction frame 4.

Using a common mount to carry either a fixed head cutting unit 22 or a flex head cutting unit 22' simplifies the manufacture of traction frame 4 as well as the assembly of mower 2. Traction frame 4 is preferably identical in the different mower models with side members 4 preferably each being identical to one another and comprising a single common cast piece. This is a manufacturing efficiency that leads to less cost in manufacturing traction frame 4 and simplifies management of inventory for production purposes since different traction frames need not be produced and then stocked. In addition, how the different cutting units 22, 22' mount on traction frame 4 is the same which eases the assembly task in securing different cutting units 22, 22' to traction frame 4. For example, a line worker need only learn and follow one method of attaching a cutting unit 22 or 22' to traction frame 4 rather than follow two different methods. These advantages lead to cost savings which may be passed on to customers and/or retained by the manufacturer.

In Situ Backlapping

It is customary in reel mowers 2 of the type disclosed herein to periodically conduct a backlapping operation to maintain a sharp, high quality cut at the interface between the blades of cutting reel 28 and the sharpened cutting edge of the bedknife. Normally during a grass cutting operation, the blades of cutting reel 28 are rotating in a direction in which the reel blades push the uncut grass against the forwardly facing cutting edge of the bedknife. In a backlapping operation, cutting reels 28 are driven in the reverse direction while a grinding compound is applied to the blade/bedknife interface. In prior art backlapping methods, this has been done in different ways including removing cutting unit 22 entirely from mower 2 and placing it into a separate machine to drive reel 28 in reverse during the backlapping operation. These prior art backlapping methods are cumbersome, labor intensive, and involve the use of separate machines or drives for reversing the direction of rotation of cutting reel 28.

As best shown in FIG. 2 and as is typical of many mowers 2 of the type disclosed in this invention, drum halves 10 of traction drum 12 have axles 186 which extend laterally exteriorly of the outer sides of drum halves 10. This is for the purpose of allowing ground engaging transport wheels 188 having pneumatic, treaded tires mounted on rims to be installed on the extended portions of the axles. Transport wheels 188 have a greater diameter than the diameter of traction drum 12. Thus, transport wheels 188 can be installed to lift traction drum 12 up off the ground and prevent wear or damage to traction drum 12 when mower 2 is being transported from place to place and may cross non-turf surfaces such as paved surfaces.

Figure 17:
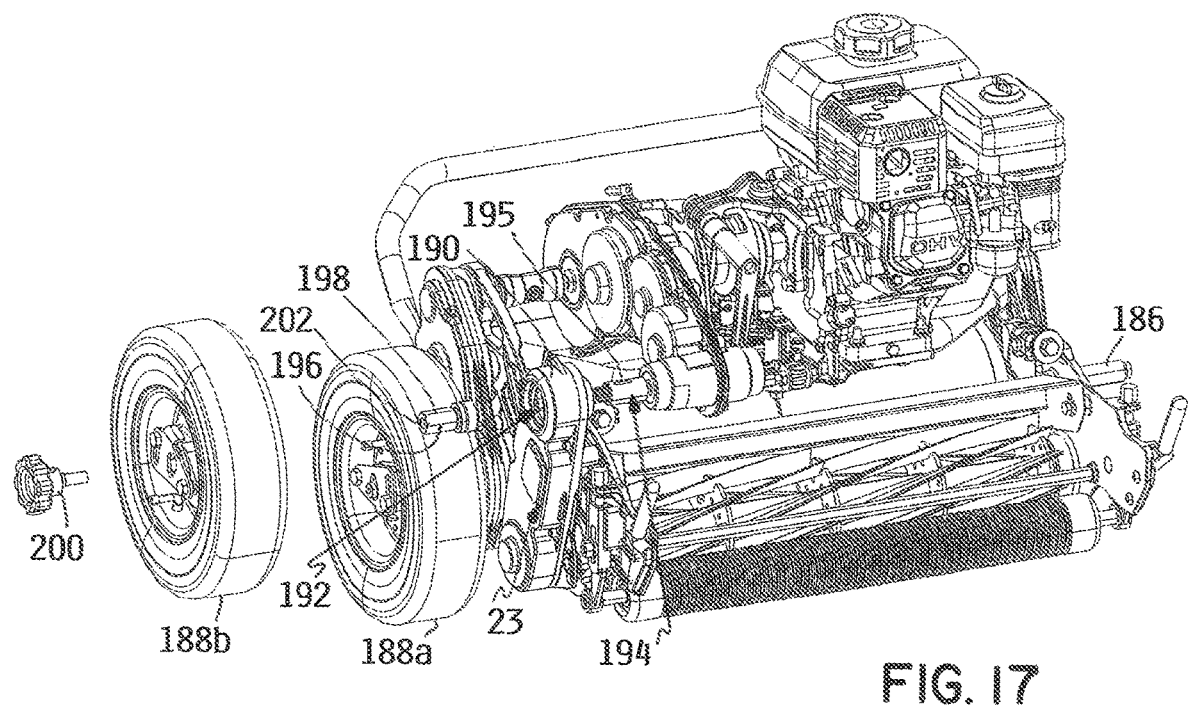
FIG. 17 is a front perspective view of a portion of the mower of FIG. 1, particularly illustrating in an exploded form how both transport wheels may be used in a backlapping operation to sharpen the blades of the reel cutting unit with one such transport wheel remaining in its usual place on its corresponding traction drum while the other transport wheel is dismounted from its corresponding traction drum and is shown prior to being coupled to the reel drive input shaft.
Figure 18:
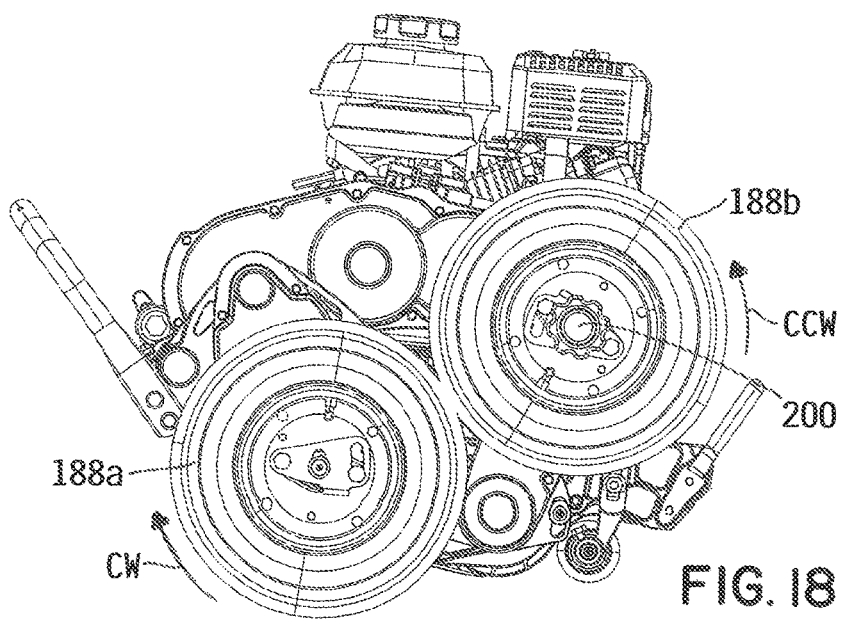
FIG. 18 is a side elevational view of what is shown in FIG. 14, particularly illustrating the contact between the transport wheels during a backlapping operation to achieve the opposite direction of rotation of the reel that is required during a backlapping operation.

Mower 2 of this invention is adapted to perform a backlapping operation in situ without having to remove cutting unit 22 from traction frame 4. It utilizes both transport wheels 188 to do so. As shown in FIGS. 17 and 18, a first transport wheel 188*a* is installed on traction drum 12 in the usual manner on the side of mower 2 having reel drive 23. Second transport wheel 188*b* is not installed in its usual spot on the other side of traction drum 12, but is used as an idler wheel in a novel way in the backlapping operation.

To use second transport 188*b* wheel for backlapping, the upper end of a reel drive gearbox 190 that is part of reel drive 23 is opened by removing a cover to expose the outer side of an input gear 192 that receives power from a drive coupler 194 that is ultimately powered from prime mover 6. Drive coupler 194 remains engaged with the inner side of input gear 192 of reel drive gearbox 190. However, drive coupler 194 includes a laterally slidable sleeve 195 that is in a drive engaged position as shown in FIG. 17. However, when one desires to conduct a backlapping operation, sleeve 195 can be laterally shifted to the left in FIG. 17 and retained in such a shifted position to disconnect reel drive gearbox 190 from the remaining portion of reel drive 23 to thereby render reel drive 23 inoperative.

After access is had to the outer side of input gear 192, a short stub axle 196 can be threaded into or attached in any suitable way to the outer side of input gear 192. Stub axle 196 is then used to mount second transport wheel 188b thereon in an elevated and partially forward position relative to first transport wheel 188a as best shown in FIG. 18. In this position, a lower rear portion of the tire of second transport wheel 188b contacts and abuts against an upper front portion of the tire of first transport wheel 188a. Stub axle 196 has a drive connection to second transport wheel 188b through a hexagonal section 198 of stub axle 196 that is non-rotatably received in a similar hexagonal section (not shown) in the hub of the rim of second transport wheel 188b. After second transport wheel 188b has been installed on stub axle 196, it is held in place thereon by a threaded outer retainer 200 that is screwed into a threaded bore 202 in hexagonal section 198 of stub axle 196.

As best shown in FIGS. 1 and 2, the inner side of reel drive gearbox 190 has a post 191 that receives a locking bolt (not shown) that passes through an arcuate slot 27 in the adjacent side plate 26 of cutting unit 22. The locking bolt can be tightened within post 191 to lock or clamp gearbox 190 against side plate 26. However, when the locking bolt is loosened, gearbox 190 can be pivoted about the axis of cutting reel 28 to be swung forwardly and rearwardly along the length of slot 27. This allows the upper end of gearbox 190 to be swung forwardly to help the user install second transport wheel 188b on stub axle without interfering with first transport wheel 188a. After second transport wheel 188b is so installed, the upper end of gearbox 190 can then be swung rearwardly to bring the two transport wheels 188a and 188b into their proper frictional engagement. When such engagement has been established, the locking bolt can be retightened within post 191 to relock or clamp gearbox 190 against side plate 22 in the backlapping, engaged position of wheels 188a and 188b.

With second transport wheel 188b having been installed as described above and as shown in FIG. 18, mower 2 must be blocked or jacked up off the ground enough that first transport wheel 188a and traction drum 12 are raised out of contact with the ground. If prime mover 6 is then put into operation with reel drive 23 being inoperative, the traction drive control, namely either pivotal control lever 27 or bail 150, may be activated to engage traction drive 13. This rotates first transport wheel 188a in a clockwise direction CW corresponding to the forward direction that mower 2 would have had if first transport wheel 188a or traction drum 12 had been in contact with the ground. In turn, the rotation of first transport wheel 188a in clockwise direction CW rotates second transport wheel 188b in a counter clockwise direction CCW to cause cutting reel 28 to rotate reversely relative to its normal direction of rotation. In other words, rather than having cutting reel 28 rotate such that its blades move rearwardly towards the cutting edge of the bedknife, the blades of cutting reel 28 now move forwardly away from the cutting edge of the bedknife. With this reversal of rotation, the backlapping operation may commence with the grinding compound being placed between the blades of cutting reel 28 and the bedknife.

The backlapping operation made possible by this invention allows backlapping without removing cutting unit 22 from traction frame 4. In addition, backlapping can be done without using any additional reel drives or components other than what are already provided on mower 2. Transport wheels 188 are a part of mower 2 and their use as disclosed herein allows backlapping simply by engaging traction drive 13 while making reel drive 23 inoperative, e.g. by sliding sleeve 195 on drive coupler 194 to the drive disengaged position. This allows for an effective reversal of the direction of reel 28 without having to use any external drives for that purpose and even when prime mover 6, traction drive 13, and reel drive 23 are mechanical in nature. The advantages of this are apparent to those skilled in the art.

Other Modifications

The features of this invention as set forth in the preceding sections may all be used jointly in connection with a single mower 2. Alternatively, each of the features may be used singly on a given mower 2 or in various permutations or combinations of a plurality of features used together without using other of the features.

Various other modifications will be apparent to those skilled in the art. Accordingly, the scope of this invention is to be limited only by the appended claims.

The invention claimed is:

1. A walk reel mower, which comprises:
   (a) a traction frame which mounts a prime mover, wherein the traction frame carries at least one ground engaging drive member that is operatively powered by the prime mover through a traction drive to self-propel the traction frame over the ground;
   (b) a handle assembly that extends rearwardly and upwardly from the traction frame, wherein the handle assembly includes a handle that is gripped by a user during operation of the mower to guide and manipulate the mower; and
   (c) a common mount adapted to attach a fixed head reel cutting unit to the traction frame or to alternatively attach a carrier frame of a flex head reel cutting unit to the traction frame, wherein the common mount comprises a first pair of laterally spaced mounting surfaces on the traction frame and a second pair of laterally spaced mounting surfaces on the fixed head reel cutting unit, or alternatively a second pair of laterally spaced mounting surfaces on the carrier frame of the flex head reel cutting unit, and wherein the first pair of mounting surfaces on the traction frame faces forwardly taken with respect to a forward direction of motion, and the second pair of mounting surfaces on the cutting units face rearwardly taken with respect to a forward direction of motion.

2. The walk reel mower of claim 1, the first pair of mounting surfaces and the second pair of mounting surfaces on the fixed head reel cutting unit or alternatively the second pair of mounting surfaces on the carrier frame of the flex head reel cutting unit having mating mounting hole patterns that receive fasteners.

3. The walk reel mower of claim 1, wherein the mounting surfaces extend generally vertically.

4. The walk reel mower of claim 1, wherein the common mount comprises a pair of laterally spaced surfaces located on or adjacent to front ends of a corresponding pair of laterally spaced side members of the traction frame.

5. The walk reel mower of claim 4, wherein the common mount further comprises a pair of laterally spaced surfaces located on or adjacent to rear ends of a corresponding pair of laterally spaced side plates of the fixed head reel cutting unit when the fixed head reel cutting unit is attached to the traction frame.

6. The walk reel mower of claim 5, wherein the common mount further comprises a pair of laterally spaced surfaces located on or adjacent to rear ends of a corresponding pair of laterally spaced sides of the carrier frame when the flex head reel cutting unit is alternatively attached to the traction frame instead of the fixed head reel cutting unit.

7. The walk reel mower of claim 6, wherein the laterally spaced surfaces of the traction frame, of the fixed head reel cutting unit, and of the flex head reel cutting unit are generally vertical surfaces.

\* \* \* \* \*